US012008334B2

(12) United States Patent
Liu et al.

(10) Patent No.: US 12,008,334 B2
(45) Date of Patent: Jun. 11, 2024

(54) SECURE TRANSLATION OF SENSITIVE CONTENT

(71) Applicant: Citrix Systems, Inc., Fort Lauderdale, FL (US)

(72) Inventors: Yimin Liu, Nianjing (CN); Sai Xu, Nanjing (CN)

(*) Notice: Subject to any disclaimer, the term of this patent is extended or adjusted under 35 U.S.C. 154(b) by 885 days.

(21) Appl. No.: 16/930,955

(22) Filed: Jul. 16, 2020

(65) Prior Publication Data

US 2021/0326537 A1 Oct. 21, 2021

Related U.S. Application Data

(63) Continuation of application No. PCT/CN2020/085979, filed on Apr. 21, 2020.

(51) Int. Cl.
*G06F 40/58* (2020.01)
*G06F 21/62* (2013.01)
*G06F 40/47* (2020.01)

(52) U.S. Cl.
CPC .......... *G06F 40/58* (2020.01); *G06F 21/6245* (2013.01); *G06F 40/47* (2020.01)

(58) Field of Classification Search
CPC .......... G06F 40/58; G06F 40/44; G06F 40/45; G06F 40/47
See application file for complete search history.

(56) References Cited

U.S. PATENT DOCUMENTS

| | | | |
|---|---|---|---|
| 6,345,244 B1 | 2/2002 | Clark | |
| 9,201,870 B2 * | 12/2015 | Jurach, Jr. | G06F 40/45 |
| 10,262,141 B2 * | 4/2019 | Kocher | G06F 21/602 |
| 11,474,958 B1 * | 10/2022 | Dhuse | G06F 3/067 |
| 2003/0145017 A1 * | 7/2003 | Patton | G06F 40/117 |
| | | | 715/255 |
| 2004/0078595 A1 * | 4/2004 | Kent, Jr. | G06Q 10/107 |
| | | | 713/160 |
| 2004/0078596 A1 * | 4/2004 | Kent, Jr. | H04L 69/08 |
| | | | 713/160 |

(Continued)

FOREIGN PATENT DOCUMENTS

CN 104462073 A 3/2015

OTHER PUBLICATIONS

Jan. 15, 2021 (WO) International Search Report and Written Opinion—App. PCT/CN2020/085979.

*Primary Examiner* — Lamont M Spooner

(57) ABSTRACT

Methods and systems for secure translation of sensitive content are described herein. In the method, content of a file may be segmented into a plurality of sections of text. At least one section of text includes an item of sensitive content and items of nonsensitive content. The item of sensitive content may be replaced with replacement content, which enables translation of the at least one section of text without use of the sensitive content. The plurality of sections of text may be sent to remote computing devices for translation. After translation, the translation of the at least one section of text received from the remote computing device may be modified to include the item of sensitive content instead of the replacement content. A translation of the content of the file may be generated based on translations of the plurality of sections of text received from the remote computing devices.

20 Claims, 12 Drawing Sheets

(56) References Cited

U.S. PATENT DOCUMENTS

| | | | |
|---|---|---|---|
| 2004/0117501 A1* | 6/2004 | Day | G06F 9/454 709/232 |
| 2006/0005017 A1* | 1/2006 | Black | H04L 63/0428 713/165 |
| 2009/0208001 A1* | 8/2009 | Kent, Jr. | H04L 63/0457 380/42 |
| 2013/0275545 A1* | 10/2013 | Baptist | H04L 67/01 709/215 |
| 2013/0275744 A1* | 10/2013 | Resch | H04L 67/10 713/150 |
| 2013/0275776 A1* | 10/2013 | Baptist | H04L 63/0428 713/193 |
| 2015/0295902 A1* | 10/2015 | Kent, Jr. | H04L 63/0428 713/150 |
| 2017/0004319 A1* | 1/2017 | Goldsack | G06F 21/577 |
| 2018/0351733 A1* | 12/2018 | Rohel | H04L 63/0428 |
| 2018/0351923 A1* | 12/2018 | Rohel | G06F 16/986 |
| 2019/0095431 A1* | 3/2019 | Nishida | G06F 40/151 |
| 2019/0384820 A1* | 12/2019 | Liu | G06F 40/295 |
| 2019/0392176 A1* | 12/2019 | Taron | G06F 21/32 |
| 2020/0019558 A1* | 1/2020 | Okorafor | G06F 21/6254 |

\* cited by examiner

SECURE TRANSLATION OF SENSITIVE CONTENT

CROSS-REFERENCE TO RELATED APPLICATIONS

This application is a continuation of co-pending International Application No. PCT/CN2020/085979, entitled "SECURE TRANSLATION OF SENSITIVE CONTENT," filed on Apr. 21, 2020. The content of which is incorporated herein by reference in its entirety.

FIELD

Aspects described herein generally relate to hardware, software, networks, and distributed computing systems. More specifically, one or more aspects describe herein provide methods and techniques for translation of digital content.

BACKGROUND

Translation of digital content is becoming increasingly important in interlingual communication. Technological advances in machine translation and computer-assisted translation have led to changes in translation as a means of interlingual communication. For example, the emergence of machine translation such as online translation engines makes translation more accessible.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

When entrusting a translation agency to translate the content of a file, the translation agency generally is expected to protect the sensitive information in the file. However, the sensitive or proprietary information in the file can be easily accessible by the translation agency and a non-disclosure agreement between the translation agency and the entrusting client may not be sufficient to maintain the secrecy of the information. Further, an online translation engine, such as Google Translate and Microsoft Translator, may analyze and use the content of the file to provide better service to the user, which means that the translation engine may obtain and retain the sensitive information from the file. Thus, there remains a need to minimize the risk of leaking sensitive information when using an untrusted translation agency or engine to translate the content of the file.

To overcome limitations in the prior art described above, and to overcome other limitations that will be apparent upon reading and understanding the present specification, aspects described herein are directed towards secure translation of digital content.

In an embodiment of the present disclosure, a method may be provided for secure translation of digital content. In the method, content of a file may be segmented into a plurality of sections of text. At least one section of text includes an item of sensitive content and items of nonsensitive content. The item of sensitive content may be replaced with replacement content, which enables translation of the at least one section of text without use of the sensitive content. Further, the plurality of sections of text may be sent to remote computing devices for translation. The at least one section of text may be sent to a remote computing device different than another remote computing device for translation of another section of text. The translation of the at least one section of text received from the remote computing device may be modified to include the item of sensitive content instead of the replacement content, so that the at least one section of text includes the item of sensitive content in untranslated form and the items of nonsensitive content in translated form. A translation of the content of the file may be generated based on translations of the plurality of sections of text received from the remote computing devices, so as to prevent the release of the item of sensitive content during translation of the file.

In an embodiment of the present disclosure, an apparatus may be provided for secure translation of digital content. The apparatus comprises one or more processors; and memory storing instructions that, when executed by the one or more processors, cause the apparatus to segment content of a file into a plurality of sections of text. At least one section of text includes an item of sensitive content and items of nonsensitive content. The instructions further cause the apparatus to replace the item of sensitive content with replacement content. The replacement content enables translation of the at least one section of text without use of the sensitive content. Further, the instructions cause the apparatus to send the plurality of sections of text to remote computing devices for translation. The at least one section of text is sent to a remote computing device different than another remote computing device for translation of another section of text. Further, the instructions cause the apparatus to modify the translation of the at least one section of text received from the remote computing device to include the item of sensitive content instead of the replacement content, so that the at least one section of text includes the item of sensitive content in untranslated form and the items of nonsensitive content in translated form. Further, the instructions cause the apparatus to generate a translation of the content of the file based on translations of the plurality of sections of text received from the remote computing devices, so as to prevent the release of the item of sensitive content during translation of the file.

In an embodiment of the present disclosure, one or more non-transitory computer readable media may be provided to perform one or more of the processes described herein.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As discussed above, the content of a file during a language translation process may be released to the public. As a result, an online translation engine may not be used for translating sensitive information. However, to take advantage of the free or inexpensive services and quick turnaround time of online translation engines, there remains a need to minimize the risk of leaking sensitive information when using a translation service to translate the content of the file.

As a general introduction to the subject matter described in more detail below, aspects described herein are directed towards preventing the release of sensitive information in a file when performing an action on the file (e.g., translating the file). For example, a computing device may replace the sensitive information in the file with nonsensitive information and segment the file into a plurality of sections of text. The computing device may further send individual sections of text to one of a plurality of translation engines/services for translation and ensure that no single translation engine has access to each section of text. As a result, the secrecy and security of the sensitive information are ensured.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "connected," "coupled," and other similar terms, is meant to include both direct and indirect connecting and coupling.

Computing Architecture

Figure 1:
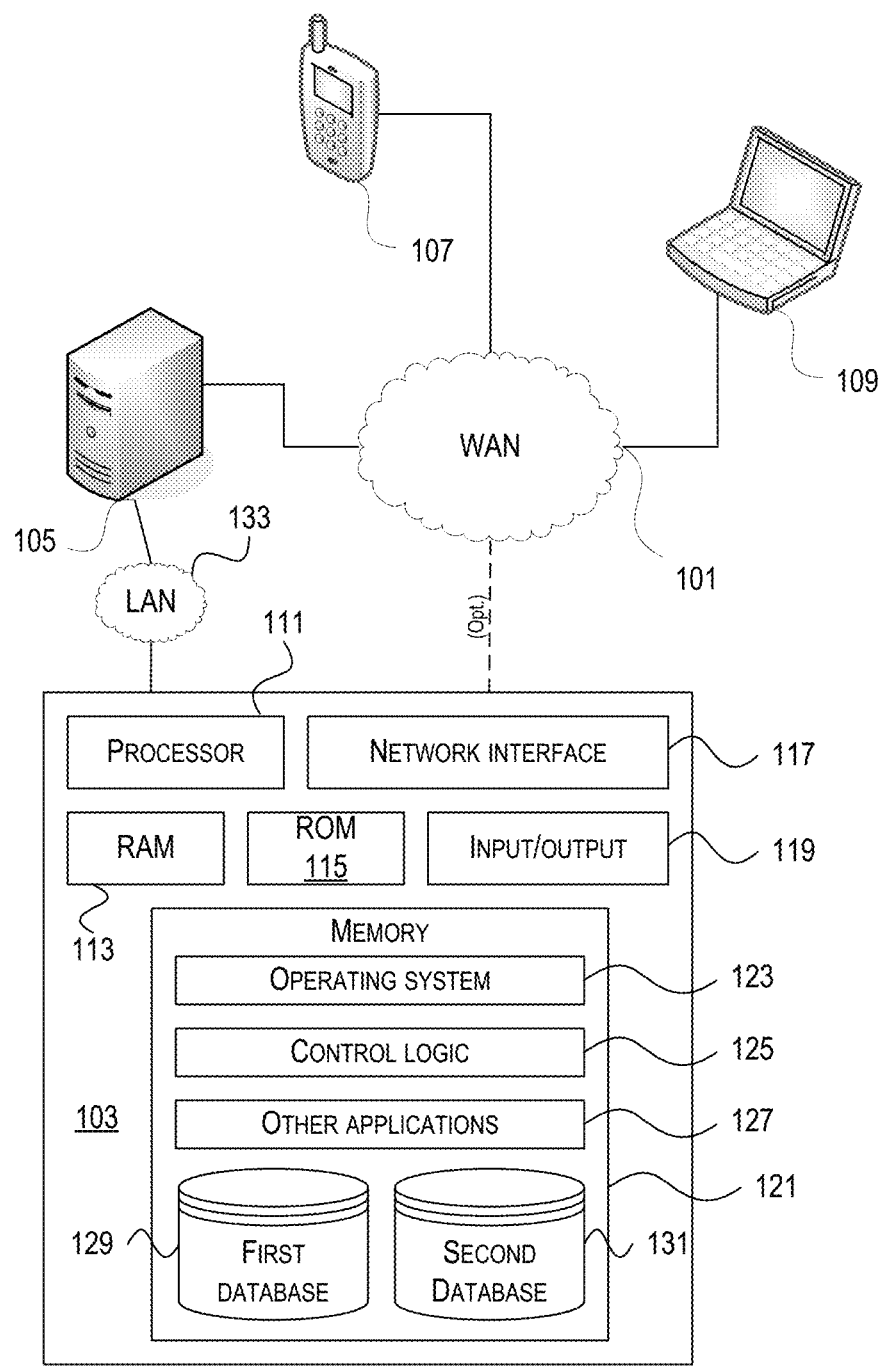
FIG. 1 depicts an illustrative computer system architecture that may be used in accordance with one or more illustrative aspects described herein.

Computer software, hardware, and networks may be utilized in a variety of different system environments, including standalone, networked, remote-access (also known as remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data-attributable to a single entity-which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines.

FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic 125 may also be referred to herein as the data server software 125. Functionality of the data server software 125 may refer to operations or decisions made automatically based on rules coded into the control logic 125, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database 129 may include the second database 131 (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, solid state storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
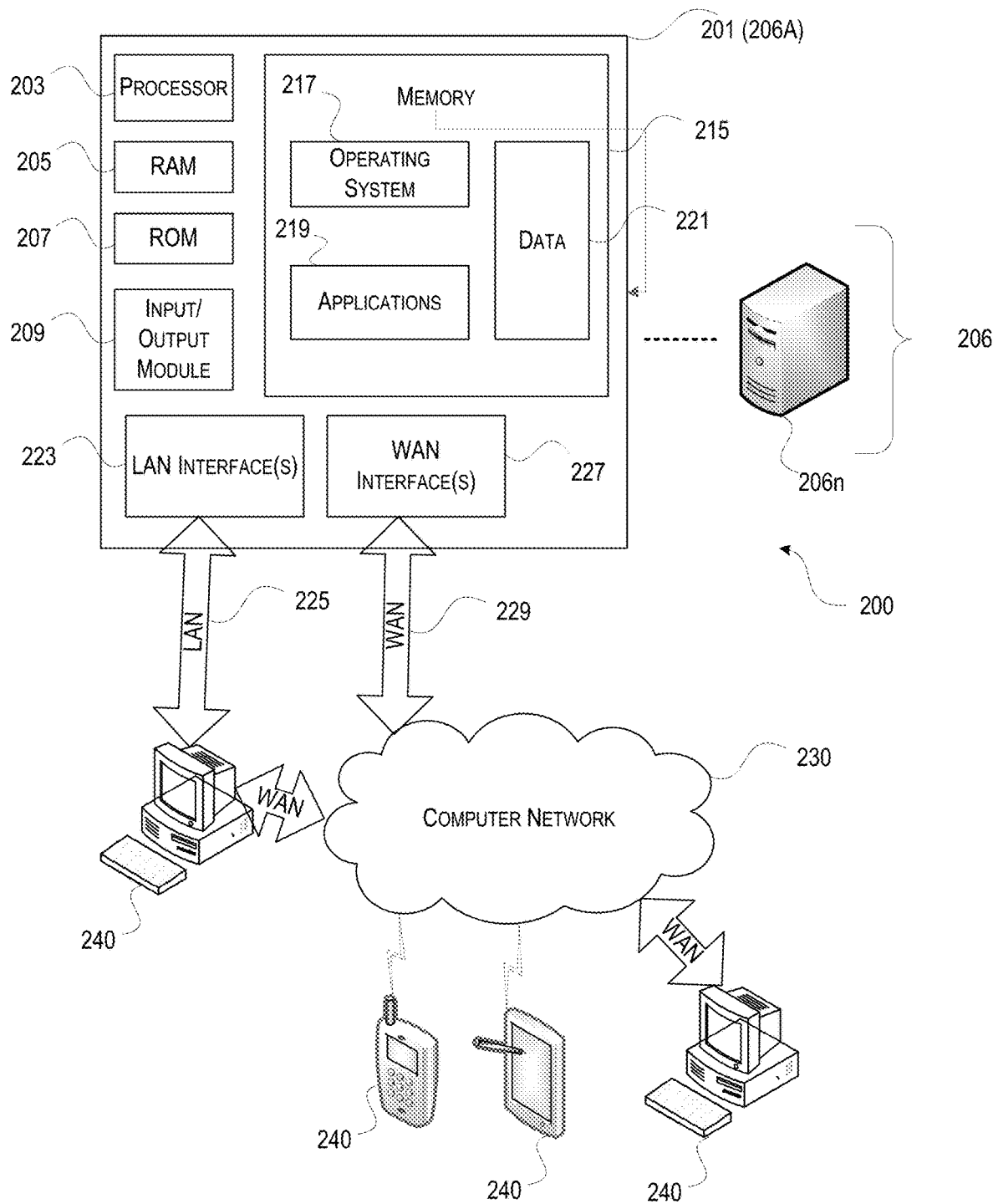
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a computing device 201 in an illustrative computing environment 200 that may be used according to one or more illustrative aspects described herein. Computing device 201 may be used as a server 206a in a single-server or multi-server desktop virtualization system (e.g., a remote access or cloud system) and can be configured to provide virtual machines for client access devices. The computing device 201 may have a processor 203 for controlling overall operation of the device 201 and its associated components, including RAM 205, ROM 207, Input/Output (I/O) module 209, and memory 215.

I/O module 209 may include a mouse, keypad, touch screen, scanner, optical reader, and/or stylus (or other input device(s)) through which a user of computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices and/or client machines). The terminals 240 may be personal computers, mobile devices, laptop computers, tablets, or servers that include many or all of the elements described above with respect to the computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem or other wide area network interface 227 for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in other aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Florida; or the Remote Desktop Protocol (RDP) manufactured by the Microsoft Corporation of Redmond, Washington.

A remote computing environment may include more than one server 206a-206n such that the servers 206a-206n are logically grouped together into a server farm 206, for example, in a cloud computing environment. The server farm 206 may include servers 206 that are geographically dispersed while logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b (not shown), and responds to the request generated by the client machine 240 with a response from the second server 206b (not shown.) First server 206a may acquire an enumeration of applications available to the client machine 240 as well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

Figure 3:
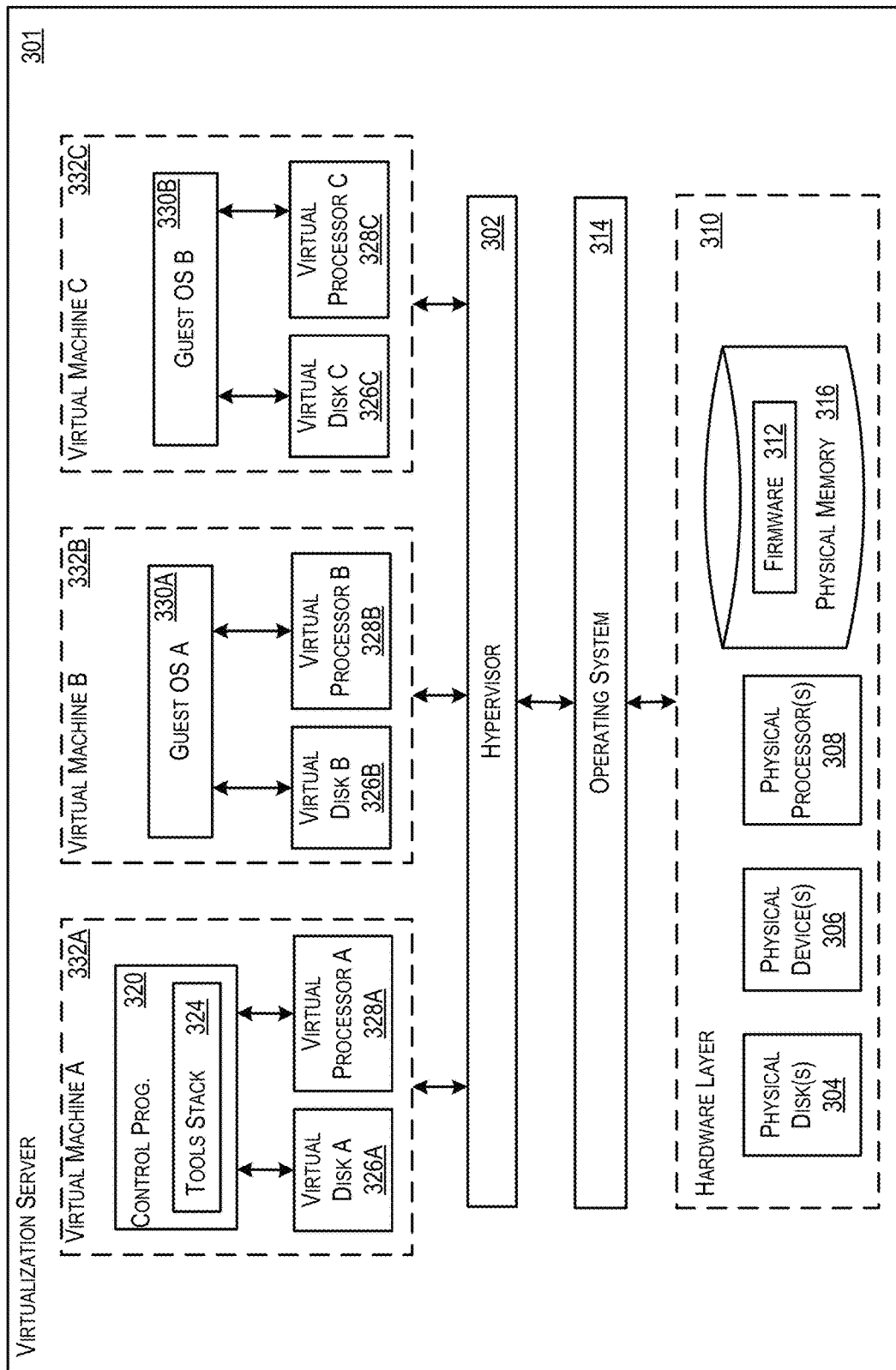
FIG. 3 depicts an illustrative virtualized system architecture that may be used in accordance with one or more illustrative aspects described herein.

FIG. 3 shows a high-level architecture of an illustrative desktop virtualization system. As shown, the desktop virtualization system may be single-server or multi-server system, or cloud system, including at least one virtualization server 301 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

A computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer that can include one or more physical disks 304, one or more physical devices 306, one or more physical processors 308, and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, Dom0, Domain 0, or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more physical memory 316. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor executes within an operating system 314 executing on the virtualization server 301. Virtual machines may then execute at a level above the hypervisor 302. In some embodiments, the Type 2 hypervisor may execute within the context of a user's operating system such that the Type 2 hypervisor interacts with the user's operating system. In other embodiments, one or more virtualization servers 301 in a virtualization environment may instead include a Type 1 hypervisor (not shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316, and any other component included in hardware layer 310 of the virtualization server 301. Hypervisor 302 may be used to emulate virtual hardware, partition physical hardware, virtualize physical hardware, and/or execute virtual machines that provide access to computing environments. In still other embodiments, hypervisor 302 may control processor scheduling and memory partitioning for a virtual machine 332 executing on virtualization server 301. Hypervisor 302 may include those manufactured by VMWare, Inc., of Palo Alto, California; HyperV, VirtualServer or virtual PC hypervisors provided by Microsoft, or others. In some embodiments, virtualization server 301 may execute a hypervisor 302 that creates a virtual machine platform on which guest operating systems may execute. In these embodiments, the virtualization server 301 may be referred to as a host server. An example of such a virtualization server is the Citrix Hypervisor provided by Citrix Systems, Inc., of Fort Lauderdale, FL.

Hypervisor 302 may create one or more virtual machines 332B-C (generally 332) in which guest operating systems 330 execute. In some embodiments, hypervisor 302 may load a virtual machine image to create a virtual machine 332. In other embodiments, the hypervisor 302 may execute a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may present at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, may imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, may provide each virtual machine 332 with a unique virtual view of the physical hardware, memory, processor, and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor, and other system resources available to the virtual machines 332.

Each virtual machine 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided, and managed by the hypervisor 302. In some embodiments, hypervisor 302 provides each virtual machine 332 with a unique view of the physical disks 304. Thus, in these embodiments, the particular virtual disk 326 included in each virtual machine 332 can be unique when compared with the other virtual disks 326.

A virtual processor 328 can be a virtualized view of one or more physical processors 308 of the virtualization server 301. In some embodiments, the virtualized view of the physical processors 308 can be generated, provided, and managed by hypervisor 302. In some embodiments, virtual processor 328 has substantially all of the same characteristics of at least one physical processor 308. In other embodiments, virtual processor 308 provides a modified view of physical processors 308 such that at least some of the characteristics of the virtual processor 328 are different than the characteristics of the corresponding physical processor 308.

Figure 4:
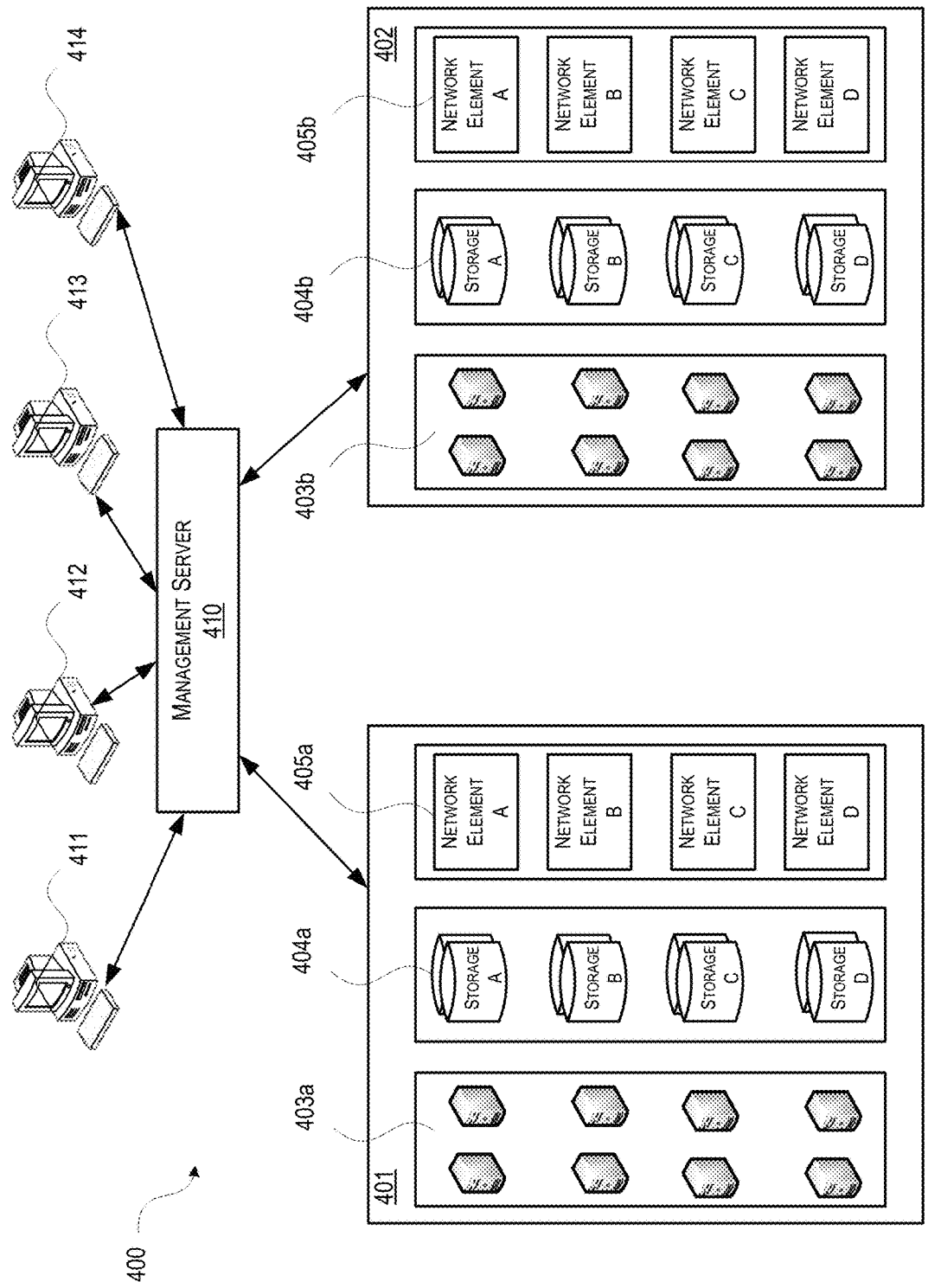
FIG. 4 depicts an illustrative cloud-based system architecture that may be used in accordance with one or more illustrative aspects described herein.

With further reference to FIG. 4, some aspects described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403a-403b (generally referred herein as "host servers 403"), storage resources 404a-404b (generally referred herein as "storage resources 404"), and network elements 405a-405b (generally referred herein as "network resources 405")) of the cloud system.

Management server 410 may be implemented on one or more physical servers. The management server 410 may run, for example, Citrix Cloud by Citrix Systems, Inc. of Ft. Lauderdale, FL, or OPENSTACK, among others. Management server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system 400. For example, the management server 410 may provide a set of application programming interfaces (APIs) and/or one or more cloud operator console applications (e.g., web-based or standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy virtual machines within the cloud. Client computers 411-414 may connect to management server 410 via the Internet or some other communication network, and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related, for example, to different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management server 410 may be located at one of the availability zones, or at a separate location. Each zone may include an internal network that interfaces with devices that are outside of the zone, such as the management server 410, through a gateway. End users of the cloud (e.g., clients 411-414) might or might not be aware of the distinctions between zones. For example, an end user may request the creation of a virtual machine having a specified amount of memory, processing power, and network capabilities. The management server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, such as the virtualization servers 301 described above, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 403 with the physical computing resources. Known cloud systems may alternatively be used, e.g., WINDOWS AZURE (Microsoft Corporation of Redmond Washington), AMAZON EC2 (Amazon.com Inc. of Seattle, Washington), IBM BLUE CLOUD (IBM Corporation of Armonk, New York), or others.

Figure 5A:
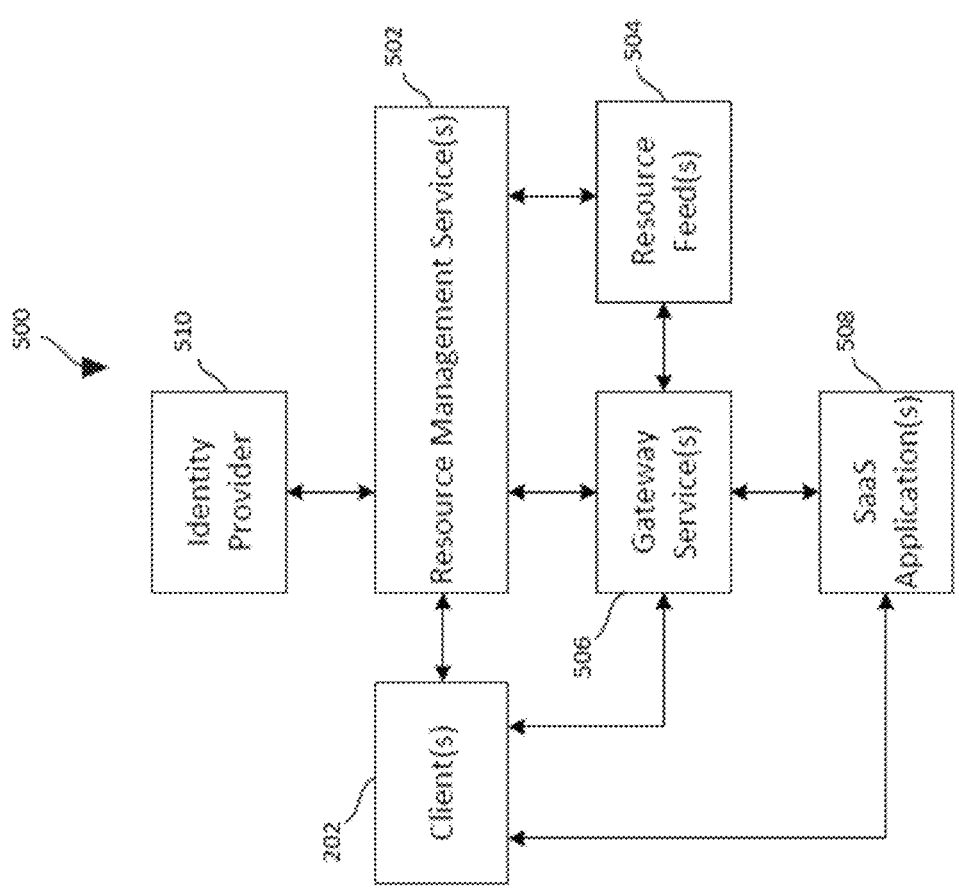
FIG. 5A is a block diagram of an example system in which resource management services may manage and streamline access by clients to resource feeds (via one or more gateway services) and/or software-as-a-service (SaaS) applications.

FIG. 5A is a block diagram of an example multi-resource access system 500 in which one or more resource management services 502 may manage and streamline access by one or more clients 202 to one or more resource feeds 504 (via one or more gateway services 506) and/or one or more software-as-a-service (SaaS) applications 508. In particular, the resource management service(s) 502 may employ an identity provider 510 to authenticate the identity of a user of a client 202 and, following authentication, identify one of more resources the user is authorized to access. In response to the user selecting one of the identified resources, the resource management service(s) 502 may send appropriate access credentials to the requesting client 202, and the client 202 may then use those credentials to access the selected resource. For the resource feed(s) 504, the client 202 may use the supplied credentials to access the selected resource via a gateway service 506. For the SaaS application(s) 508, the client 202 may use the credentials to access the selected application directly.

The client(s) 202 may be any type of computing devices capable of accessing the resource feed(s) 504 and/or the SaaS application(s) 508, and may, for example, include a variety of desktop or laptop computers, smartphones, tablets, etc. The resource feed(s) 504 may include any of numerous resource types and may be provided from any of numerous locations. In some embodiments, for example, the resource feed(s) 504 may include one or more systems or services for providing virtual applications and/or desktops to the client(s) 202, one or more file repositories and/or file sharing systems, one or more secure browser services, one or more access control services for the SaaS applications 508, one or more management services for local applications on the client(s) 202 such as translation services, one or more internet enabled devices or sensors, etc. The resource management service(s) 502, the resource feed(s) 504, the gateway service(s) 506, the SaaS application(s) 508, and the identity provider 510 may be located within an on-premises data center of an organization for which the multi-resource access system 500 is deployed, within one or more cloud computing environments, or elsewhere.

Figure 5B:
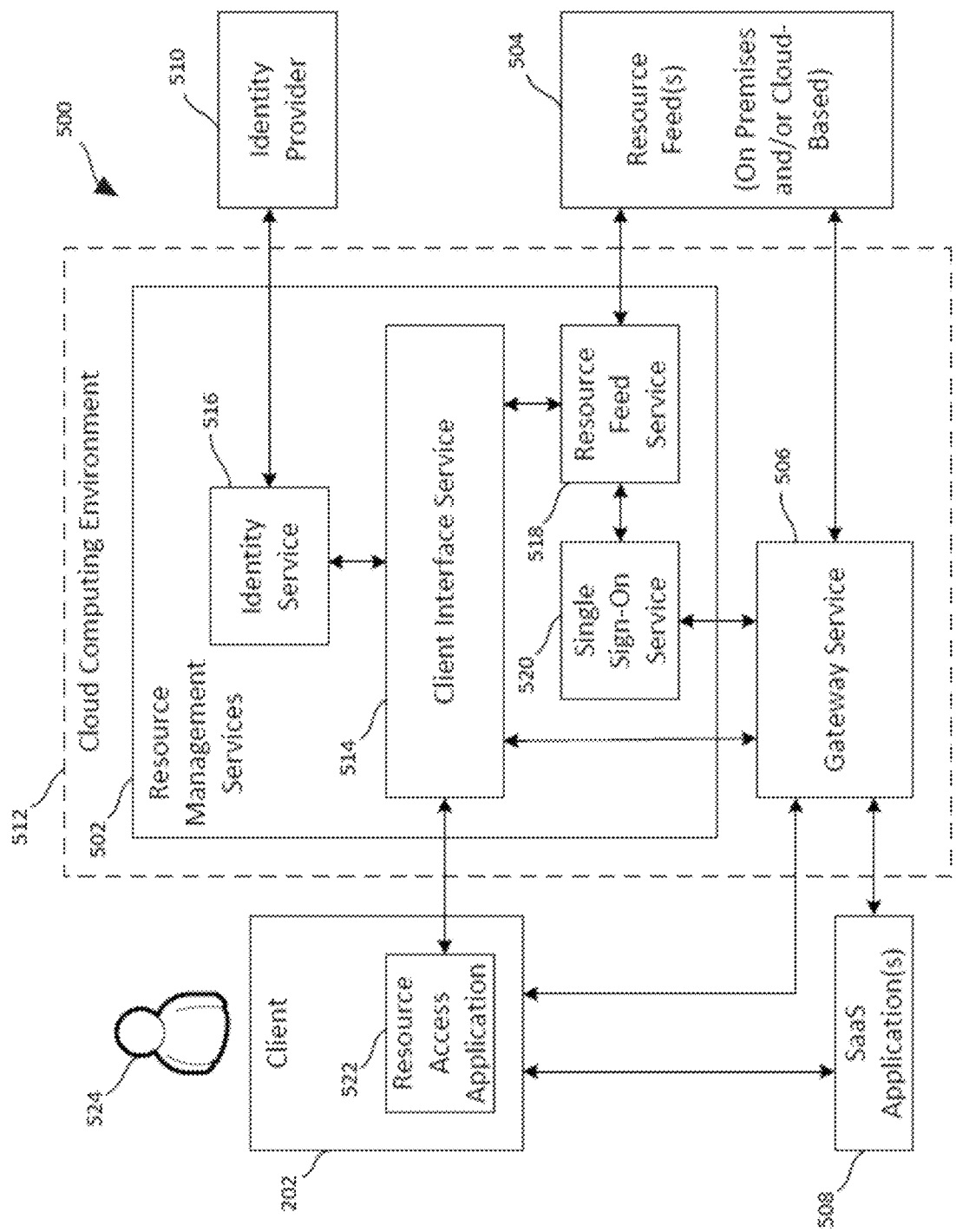
FIG. 5B is a block diagram showing an example implementation of the system shown in FIG. 5A in which various resource management services as well as a gateway service are located within a cloud computing environment.

FIG. 5B is a block diagram showing an example implementation of the multi-resource access system 500 shown in FIG. 5A in which various resource management services 502 as well as a gateway service 506 are located within a cloud computing environment 512. The cloud computing environment may, for example, include Microsoft Azure Cloud, Amazon Web Services, Google Cloud, or IBM Cloud. It should be appreciated, however, that in other implementations, one or more (or all) of the components of the resource management services 502 and/or the gateway service 506 may alternatively be located outside the cloud computing environment 512, such as within a data center hosted by an organization.

For any of the illustrated components (other than the client 202) that are not based within the cloud computing environment 512, cloud connectors (not shown in FIG. 5B) may be used to interface those components with the cloud computing environment 512. Such cloud connectors may, for example, run on Windows Server instances and/or Linux Server instances hosted in resource locations and may create a reverse proxy to route traffic between those resource locations and the cloud computing environment 512. In the illustrated example, the cloud-based resource management services 502 include a client interface service 514, an identity service 516, a resource feed service 518, and a single sign-on service 520. As shown, in some embodiments, the client 202 may use a resource access application 522 to communicate with the client interface service 514 as well as to present a user interface on the client 202 that a user 524 can operate to access the resource feed(s) 504 and/or the SaaS application(s) 508. The resource access application 522 may either be installed on the client 202, or may be executed by the client interface service 514 (or elsewhere in the multi-resource access system 500) and accessed using a web browser (not shown in FIG. 5B) on the client 202.

As explained in more detail below, in some embodiments, the resource access application 522 and associated components may provide the user 524 with a personalized, all-in-one interface enabling instant and seamless access to all the user's SaaS and web applications, files, virtual Windows applications, virtual Linux applications, desktops, mobile applications, Citrix Virtual Apps and Desktops™, local applications, and other data.

When the resource access application 522 is launched or otherwise accessed by the user 524, the client interface service 514 may send a sign-on request to the identity service 516. In some embodiments, the identity provider 510 may be located on the premises of the organization for which the multi-resource access system 500 is deployed. The identity provider 510 may, for example, correspond to an on-premises Windows Active Directory. In such embodiments, the identity provider 510 may be connected to the cloud-based identity service 516 using a cloud connector (not shown in FIG. 5B), as described above. Upon receiving a sign-on request, the identity service 516 may cause the resource access application 522 (via the client interface service 514) to prompt the user 524 for the user's authentication credentials (e.g., user-name and password). Upon receiving the user's authentication credentials, the client interface service 514 may pass the credentials along to the identity service 516, and the identity service 516 may, in turn, forward them to the identity provider 510 for authentication, for example, by comparing them against an Active Directory domain. Once the identity service 516 receives confirmation from the identity provider 510 that the user's identity has been properly authenticated, the client interface service 514 may send a request to the resource feed service 518 for a list of subscribed resources for the user 524.

In other embodiments (not illustrated in FIG. 5B), the identity provider 510 may be a cloud-based identity service, such as a Microsoft Azure Active Directory. In such embodiments, upon receiving a sign-on request from the client interface service 514, the identity service 516 may, via the client interface service 514, cause the client 202 to be redirected to the cloud-based identity service to complete an authentication process. The cloud-based identity service may then cause the client 202 to prompt the user 524 to enter the user's authentication credentials. Upon determining the user's identity has been properly authenticated, the cloud-based identity service may send a message to the resource access application 522 indicating the authentication attempt was successful, and the resource access application 522 may then inform the client interface service 514 of the successfully authentication. Once the identity service 516 receives confirmation from the client interface service 514 that the user's identity has been properly authenticated, the client interface service 514 may send a request to the resource feed service 518 for a list of subscribed resources for the user 524.

The resource feed service 518 may request identity tokens for configured resources from the single sign-on service 520. The resource feed service 518 may then pass the feed-specific identity tokens it receives to the points of authentication for the respective resource feeds 504. The resource feeds 504 may then respond with lists of resources configured for the respective identities. The resource feed service 518 may then aggregate all items from the different feeds and forward them to the client interface service 514, which may cause the resource access application 522 to present a list of available resources on a user interface of the client 202. The list of available resources may, for example, be presented on the user interface of the client 202 as a set of selectable icons or other elements corresponding to accessible resources. The resources so identified may, for example, include one or more virtual applications and/or desktops (e.g., Citrix Virtual Apps and Desktops™, VMware Horizon, Microsoft RDS, etc.), one or more file repositories and/or file sharing systems (e.g., Sharefile®, one or more secure browsers, one or more internet enabled devices or sensors, one or more local applications installed on the client 202, and/or one or more SaaS applications 508 to which the user 524 has subscribed. The lists of local applications and the SaaS applications 508 may, for example, be supplied by resource feeds 504 for respective services that manage which such applications are to be made available to the user 524 via the resource access application 522. Examples of SaaS applications 508 that may be managed and accessed as described herein include Microsoft Office 365 applications, SAP SaaS applications, Workday applications, etc.

For resources other than local applications and the SaaS application(s) 508, upon the user 524 selecting one of the listed available resources, the resource access application 522 may cause the client interface service 514 to forward a request for the specified resource to the resource feed service 518. In response to receiving such a request, the resource feed service 518 may request an identity token for the corresponding feed from the single sign-on service 520. The resource feed service 518 may then pass the identity token received from the single sign-on service 520 to the client interface service 514 where a launch ticket for the resource may be generated and sent to the resource access application 522. Upon receiving the launch ticket, the resource access application 522 may initiate a secure session to the gateway service 506 and present the launch ticket. When the gateway service 506 is presented with the launch ticket, it may initiate a secure session to the appropriate resource feed and present the identity token to that feed to seamlessly authenticate the user 524. Once the session initializes, the client 202 may proceed to access the selected resource.

When the user 524 selects a local application (e.g., a translation application), the resource access application 522 may cause the selected local application to launch on the client 202. When the user 524 selects a SaaS application 508, the resource access application 522 may cause the client interface service 514 to request a one-time uniform resource locator (URL) from the gateway service 506 as well a preferred browser for use in accessing the SaaS application 508. After the gateway service 506 returns the one-time URL and identifies the preferred browser, the client interface service 514 may pass that information along to the resource access application 522. The client 202 may then launch the identified browser and initiate a connection to the gateway service 506. The gateway service 506 may then request an assertion from the single sign-on service 520. Upon receiving the assertion, the gateway service 506 may cause the identified browser on the client 202 to be redirected to the logon page for identified SaaS application 508 and present the assertion. The SaaS may then contact the gateway service 506 to validate the assertion and authenticate the user 524. Once the user has been authenticated, communication may occur directly between the identified browser and the selected SaaS application 508, thus allowing the user 524 to use the client 202 to access the selected SaaS application 508.

In some embodiments, the preferred browser identified by the gateway service 506 may be a specialized browser embedded in the resource access application 522 (when the resource access application 522 is installed on the client 202) or provided by one of the resource feeds 504 (when the resource access application 522 is located remotely), e.g., via a secure browser service. In such embodiments, the SaaS applications 508 may incorporate enhanced security policies to enforce one or more restrictions on the embedded browser. Examples of such policies include (1) requiring use of the specialized browser and disabling use of other local browsers, (2) restricting clipboard access, e.g., by disabling cut/copy/paste operations between the application and the clipboard, (3) restricting printing, e.g., by disabling the ability to print from within the browser, (3) restricting navigation, e.g., by disabling the next and/or back browser buttons, (4) restricting downloads, e.g., by disabling the ability to download from within the SaaS application, and (5) displaying watermarks, e.g., by overlaying a screen-based watermark showing the username and IP address associated with the client 202 such that the watermark will appear as displayed on the screen if the user tries to print or take a screenshot. Further, in some embodiments, when a user selects a hyperlink within a SaaS application, the specialized browser may send the URL for the link to an access control service (e.g., implemented as one of the resource feed(s) 504) for assessment of its security risk by a web filtering service. For approved URLs, the specialized browser may be permitted to access the link. For suspicious links, however, the web filtering service may have the client interface service 514 send the link to a secure browser service, which may start a new virtual browser session with the client 202, and thus allow the user to access the potentially harmful linked content in a safe environment.

In some embodiments, in addition to or in lieu of providing the user 524 with a list of resources that are available to be accessed individually, as described above, the user 524 may instead be permitted to choose to access a streamlined feed of event notifications and/or available actions that may be taken with respect to events that are automatically detected with respect to one or more of the resources. This streamlined resource activity feed, which may be customized for individual users, may allow users to monitor important activity involving all of their resources-SaaS applications, web applications, Windows applications, Linux applications, desktops, file repositories and/or file sharing systems, and other data through a single interface, without needing to switch context from one resource to another. Further, event notifications in a resource activity feed may be accompanied by a discrete set of user-interface elements, e.g., "approve," "deny," and "see more detail" buttons, allowing a user to take one or more simple actions with respect to events right within the user's feed. In some embodiments, such a streamlined, intelligent resource activity feed may be enabled by one or more micro-applications, or "microapps," that can interface with underlying associated resources using APIs or the like. The responsive actions may be user-initiated activities that are taken within the microapps and that provide inputs to the underlying applications through the API or other interface. The actions a user performs within the microapp may, for example, be designed to address specific common problems and use cases quickly and easily, adding to increased user productivity (e.g., request personal time off, submit a help desk ticket, etc.). In some embodiments, notifications from such event-driven microapps may additionally or alternatively be pushed to clients 202 to notify a user 524 of something that requires the user's attention (e.g., approval of an expense report, new course available for registration, etc.).

Translation of Digital Content

When a client device uses an untrusted (e.g., third-party) translation engine/agency to translate a file or an article, the translation engine can easily access sensitive information in the file. Generally, a translation engine does not guarantee that it does not keep or retain the content to be translated or the translated content. Even if such a guarantee is provided, a customer might never know for certain whether that guarantee is kept or not. Unbeknownst to the customer or the client device, the translation engine or the translator may access the sensitive information and utilize the sensitive information for different purposes. For example, a Norwegian news agency on Sep. 3, 2017, reported that employees of state-run oil giant Statoil had discovered text that had been typed in online via a particular third-party translation engine could be found by anyone conducting a web search using a particular well-known search engine. Despite the problems with third-party translation engines, they may be easy to use and offer relatively inexpensive services. Therefore, people often choose to use untrusted translation engines for translation. Accordingly, there remains a need to further minimize the risk of releasing sensitive information to the translation agency and the public.

The present disclosure describes methods and apparatuses for protecting information (e.g., sensitive information) in a file to be translated. For example, if a file to be translated contains confidential information such as a potential merger agreement between two companies. The merger agreement, the name of the two companies, or even the context of the merger agreement should not be made publicly available. Therefore, cautious measures need to be taken during the translation of the content of the file. Aspects of the disclosure provide that the sensitive information (e.g., information considered sensitive by the client device) may be converted to nonsensitive information (e.g., information considered not sensitive by the client device such as a random or predetermined nonsensitive identifier) before sending to an untrusted translation engine for translation. For example, the sensitive information in a file may be mapped based on configured rules before translation. The sensitive information may include, but not limited to, a specific term (e.g., a particular noun), a price, a number, and/or a date. In order to prevent the release of the sensitive information during the translation process, a specific word may need to be replaced with a non-sensitive word. Similarly, a phrase or a sentence may be converted to a corresponding non-sensitive phrase or a non-sensitive sentence, respectively. Further, the text including the sensitive information may be segmented and sent to a plurality of translation engines for translation.

Figure 6:
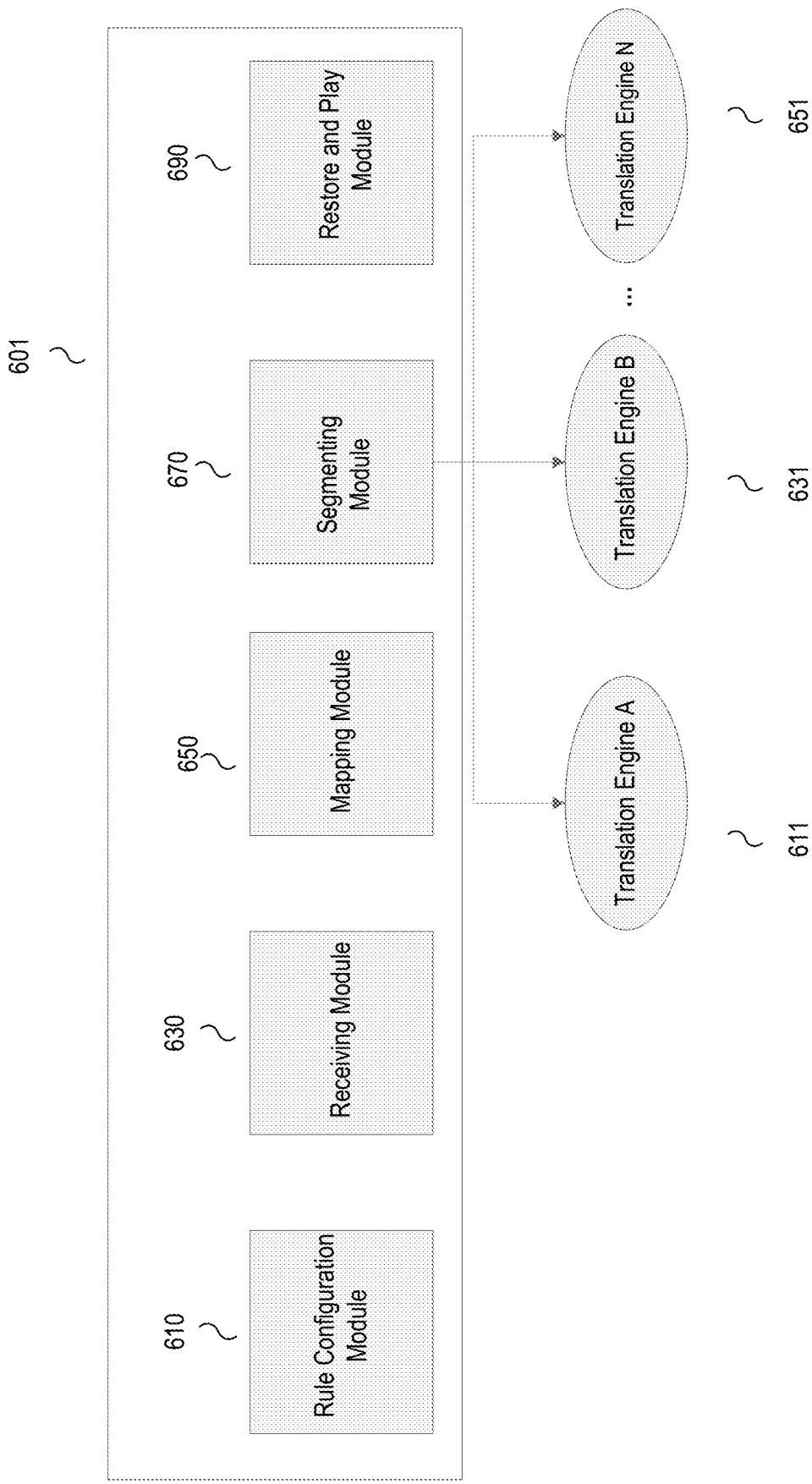
FIG. 6 depicts a schematic diagram showing an example of a computing device that may be used in accordance with one or more illustrative aspects described herein.

FIG. 6 shows a schematic diagram of an example of a computing device according to one or more aspects of the present disclosure. One or more aspects may be embodied in computer-usable or readable data and/or computer-executable instructions, such as in one or more program modules, executed by one or more computers or a server as described herein. For example, the modules described in FIG. 6 may be executed by a computing device 601 (e.g., the computing device 201, the client device 240, the web server 105, the server 206, the virtualization server 301, or the cloud management server 410 described herein). Generally, program modules include routines, programs, objects, components, data structures, etc. that perform particular tasks or implement particular abstract data types when executed by a processor in a computer or other device.

FIG. 6 shows an illustration of five modules. The first module is a rule configuration module 610. The rule configuration module 610 may be configured to set a number of rules that map and replace the sensitive information before translation in order to prevent the sensitive information from being obtained by untrusted translation engines. For example, the name of a company, a specific number, a date, or a price may be mapped and replaced with nonsensitive information (e.g., a nonsensitive identifier) before translation so that the sensitive information will not be obtained by the untrusted translation engines. The rule configuration module 610 may be configured to set rules for mapping and replacing sensitive information based on the default setting in the computing device 601 or based on the mapping rules input by the user. For example, the computing device 601 may be coupled to a memory that stores a plurality of policy files. Each policy file may include information that indicates a relationship between an item of sensitive information and a corresponding nonsensitive identifier. Table 1 shows an exemplary set of mapping rules stored in a policy file. In Table 1, "Citrix" is mapped to "company1" according to Rule 1; "Xen" is mapped to "company2" according to Rule 2; a specific number is mapped to a random number according to Rule 3; and a specific date is mapped to a random date according to Rule 4.

TABLE 1

An example of mapping rules

|  | Original text | Mapped Text |
|---|---|---|
| Rule 1 | Citrix | company1 |
| Rule 2 | Xen | company2 |
| Rule 3 | A specific number | A random number |
| Rule 4 | A specific date | A random date |

While the examples discussed above involve loading a table stored in the memory coupled to the computing device 601, the computing device 601 may load a policy file or a look-up table from another source. For example, in some arrangements, such a policy file may be stored and/or maintained in a central database rather than as a local file. In these arrangements, the computing device 601 may load the policy file by accessing and/or retrieving information from such a central database, instead of loading a local file to retrieve the table.

In some aspects of the present disclosure, different policy files may replace the same sensitive information with different content. For example, "Citrix" may be replaced with "company1" according to a first policy file, whereas "Citrix" may be replaced with "CC" according to a second policy file. Further, the first policy file may indicate which translation engines to use, whereas the second policy file might not. Policy files may be associated with one or more translation engines and may instruct the computing device to send digital content (e.g., a file or a section of the file) to be translated to a specific translation engine. If the policy file indicates that the text including sensitive information is to be sent to a trusted translation engine (e.g., an internal translation engine) instead of an untrusted translation engine, the sensitive information in the text may not need to be mapped and replaced.

In some aspects of the present disclosure, the mapping rules may include a one-to-one relationship of the words, phrases, or sentences. For example, one word of the digital content may correspond to only one non-sensitive word. Additionally or alternatively, the mapping rules may include a one-to-many relationship. For example, the word "Citrix" in the file may correspond to more than one word (e.g., company1, companyX, and/or CC).

The second module is a receiving module 630. The receiving module 630 may be configured to receive a file (or a portion thereof) or text from a client device. For example, the client device may upload a file (e.g., a document, an article) to the computing device. A user may also copy the text in the client device to the computing device. The user may determine whether certain information in the file needs to be redacted or replaced before, during, or after the uploading process of the file. If the user intends to have certain sensitive information replaced with nonsensitive identifiers, the computing device may provide a list of policy files for the user to select. The client device may also set and create its own mapping rules. Once the client device creates its own mapping rules, the rules may be stored in a policy file in the memory and the client device may choose to use those rules for subsequent translation requests. The computing device 601 may create and store a user profile and associate the translation history (e.g., mapping rules used by the user or the client device) to the user profile. The computing device 601 may update the user profile based on the most recent translation request. The user profile may also indicate the level of the secrecy generally required for the translation of the content. Therefore, the computing device 601 may determine the mapping rules for the user or the client device based on the user profile. If the user does not perform any operation on the file, the computing device may automatically apply its default mapping rules to the received file.

The computing device 601 may identify one or more items of sensitive information after the user has input the file. For example, the computing device 601 may store a list of sensitive words and phrases in the memory and automatically redact or replace those sensitive words and phrases in the file. The list of sensitive words and phrases may be determined based on the category of the content. For example, if the content of the file is related to finance, one or more items corresponding to numbers or prices in the text may be automatically determined to be sensitive information. The category of the content may be determined based on the title of the file. Additionally or alternatively, the names of one or more people/companies in the text may be automatically determined to be sensitive information. The computing device 601 may also determine items of sensitive information based on the user profile or based on the meaning of the content of the file. Semantic analysis may be used to understand and analyze the meaning of the text of the file by building structures that approximate concepts from a large set of files. Context in the surrounding text and the text structure may be analyzed to accurately determine the proper meaning of words that have more than one definition. Many methods including dictionary- and knowledge-based methods, semi-supervised or minimally supervised methods, supervised methods, and unsupervised methods may be used by the computing device 601 to solve the word-sense disambiguation problem. In this manner, machine learning techniques may be used to automatically, or partially assist with, identification of sensitive and/or confidential information. Additionally or alternatively, the client device may identify what information is sensitive and request the computing device to redact or replace the identified sensitive information.

In an example, the receiving module 630 may receive a file from a client device. The text of the file may include that "Citrix earned $12.3 billion in 2018. Citrix plans to acquire Xen for $100 million in 2019." The receiving module 630 may receive the file and automatically determine the sensitive information of the received file based on the meaning of the text of the file. For example, "Citrix," "$12.3," "Xen," and "$100" may be automatically identified as sensitive information and may be emphasized (e.g., highlighted, underscored) in the text. Details of identifying sensitive information within the text will be further described in connection with FIG. 8. The computing device 601 may receive an indication of whether the sensitive information identified or suggested by the computing device 601 is accepted or rejected. Furthermore, the computing device 601 may receive an indication that additional words, phrases, or sentences are identified as sensitive information in the text. For example, the computing device 601 may receive information indicating that the numbers "2018" and "2019" are selected as additional sensitive information in the above-mentioned text.

The computing device 601 may also comprise a mapping module 650. After the receiving module 630 receives the file input and identifies one or more items of sensitive information in the file, the mapping module 650 may be configured to map and replace the identified sensitive information with a nonsensitive identifier based on a policy file as discussed above. For example, "Citrix," "12.3," "2018," "Xen," "100," and "2019" may be identified or determined as sensitive information and the mapping rules illustrated in Table 1 may be applied. Therefore, as shown in Table 2, "Citrix" may be converted to "company1" and "Xen" may be converted to "company 2" for translation. In addition, "12.3" may be converted to "456," "100" may be converted to "789," "2018" may be converted to "1970," and "2019" may be converted to "1990" for purposes of translation of the rest of the digital content of the file. As a result, as shown in Table 3, the mapping module 650 may generate the following text after the mapping and replacing: "company1 earned $456 billion in 1970. company1 plans to acquire company2 for $789 million in 1990." Articles or files may have an identifier. The original sentence or paragraph in the article and the mapped sentence or paragraph in the article may be associated with the identifier. For example, as shown in Table 3, the identifier is associated with the currently mapped sentences.

TABLE 2

An example of mapped values

| Identifier | Original Value | Mapped Value |
|---|---|---|
| 1 | Citrix | company1 |
| 1 | Xen | company2 |
| 1 | 2018 | 1970 |
| 1 | 2019 | 1990 |
| 1 | 12.3 | 456 |
| 1 | 100 | 789 |

TABLE 3

An example of mapped sentence

| Identifier | Mapped Sentences |
|---|---|
| 1 | company1 earned $456 billion in 1970. company1 plans to acquire company2 for $789 million in 1990. |

Notably, sensitive information may be replaced with nonsensitive identifiers having similar meanings to help the translation engines accurate translate the rest of the text. In some aspects of the disclosure, only sensitive information is mapped and replaced with nonsensitive information before translation. In addition, some forms of sensitive information (e.g., numbers) may not require translation, but may be still replaced with nonsensitive information.

After the sensitive information has been replaced with nonsensitive identifiers for translation, it is still possible for the untrusted translation engine or agency to guess the true meaning of the mapped words, phrases, and sentences in view of the entire article and the context clues. For example, if an article describes Citrix's products, then even if Citrix is replaced with a random word, it is likely that the translation machine or agency can identify "Citrix" as the replaced word based on the description of the products in the article. Therefore, further measures may be taken to protect the sensitive information. As an example, before or after the sensitive information is replaced with nonsensitive identifiers, the segmenting module 670 in the computing device 601 may be configured to segment the content of the file into two or more sections of text for translation. The computing device 601 may automatically detect the punctuation marks (e.g., periods and question marks) and breaks (e.g., line breaks, paragraph breaks, section breaks, and page breaks) in the file, and segment the content of the file based on the detected symbols. For example, individual sections may include one or more paragraphs or one or more sentences of the text. The content of the file may be segmented into different sections of paragraphs based on the detected paragraph breaks in the file. Further, a paragraph of the file may be segmented into different sections of sentences based on the detected periods in the paragraph. In some examples, the division of sentences or paragraphs may be random or may be based on a rule (e.g., a predetermined rule). In some aspects of the disclosure, if the number of items of mapped information of the entire text is few than a first threshold number (e.g., 1, 2, or 3), the computing device may determine that it is not necessary to segment the content of the file for translation. Further, the rule may set a second threshold number and ensure that individual sections have fewer than a number (e.g., 1, 2, or 3) of items of mapped information. The second threshold number can be determined based on the level of secrecy required for the content of the file. For example, if the level of secrecy required for the content of the file is high, individual sections may have only one item of mapped information except when a sentence has more than one item of mapped information. If a sentence has more than one item of mapped information, the sentence itself may be an individual section. The computer device 601 may receive an indication of the level of secrecy for the content to be translated or retrieve the level of secrecy of the content from the user profile.

For example, the above-described text—"company1 earned $456 billion in 1970. company1 plans to acquire company2 for $789 million in 1990"—may be segmented into two sections and each section is a sentence. The segmentation of the text may also be determined based on the subject matter of the text or based on the length of the text. The client device may also choose and select its preferred way of segmentation. Table 4 shows the above-described example of segmenting the file into two sentences. In Table 4, an article is associated with an article ID, and individual segmented sections of text are associated with a section ID.

TABLE 4

An example of segmented sentences

| Article ID | Section ID | Segmented Sentence | Translated Sentence | Reverse Mapped Sentence |
|---|---|---|---|---|
| 1 | 1 | company1 earned $456 billion in 1970 | Translated Sentence 1 | |
| 1 | 2 | company1 plans to acquire company2 for $789 million in 1990. | Translated Sentence 2 | |

TABLE 5

An example of restored sentences

| Article ID | Sentence ID | Segmented Sentence | Translated Sentence | Reverse Mapped Sentence |
|---|---|---|---|---|
| 1 | 1 | company1 earned $456 billion in 1970 | Translated Sentence 1 | Reverse Mapped Sentence 1 |
| 1 | 2 | company1 plans to acquire company2 for $789 million in 1990. | Translated Sentence 2 | Reverse Mapped Sentence 2 |

After the content of the file is segmented into two or more sections, the segmenting module 670 may send individual sections of text to one of a plurality of translation engines (e.g., translation engine A 611, translation engine B 631, or translation engine N 651) for translation. Translation engines may be a trusted or an untrusted translation engine. In some examples, sections of text may be sent to different translation engines for translation so that the translation engines have access to only the one section of text that they receive. Depending on the number of sections, one or more sections may be sent to the same translation engine for translation if the number of nonsensitive identifiers in the one or more sections does not exceed a threshold number (e.g., 2, 3, or 4). In this case, the one or more sections may be non-consecutive sections. Therefore, none of the translation engines have access to the entire context of the sensitive information or each nonsensitive identifier. As a result, the secrecy and the security of the sensitive information are further ensured.

In some aspects of the present disclosure, after the content has been segmented into a number of sections. The order of the sections may be mixed up before sending to a translation engine for translation. For example, if the file includes four consecutive sections A, B, C, and D, the order of the sections may be changed to a random order (e.g., C, B, D, A). The computing device 601 may then send the sections in the random order to a translation engine for translation. In this case, it may not be necessary to send the sections to different translation engines for translation.

The computing device 601 may further comprise a restore and display module 690. The restore and display module 690 may be configured to receive translated sections of text from one or more translation engines. The restore and display module 690 may further modify the received translated sections of text by restoring the original sensitive information based on the mapping rules, as shown in Table 5. For example, the nonsensitive identifier may be replaced with the original sensitive information in the translated sentence. Further, the restore and display module 690 may identify if the nonsensitive identifier has been translated into another language. If the nonsensitive identifier has been translated into another language, the restore and display module 690 may choose to convert them back to the original language and replace them with the original sensitive information. For example, if the translation engine translates "company1" into another language, the restore and display module 690 may recognize that the word "company1" has been translated and revert it to "Citrix" according to Rule 1 in Table 1.

Notably, the all-numeric date format may be changed during translation. For example, if the language of the original text is in Chinese, the format of a date usually is year/month/day. However, if the text is translated into English, the format of the date may be changed to month/day/year. In an example, if the language of the original text is in Chinese and the date 1995/5/20 is determined to be sensitive information, the date 1995/05/20 may be mapped to 2020/3/20. The translation engine may translate 2020/3/20 to 3/20/2020 according to the date format in English. The restore and display module may be configured to first change the date format to the Chinese format and then restore the original sensitive information based on the changed format.

Further, after or before restoring the original sensitive information, the restore and display module 690 may generate a translation of the entire file by combining the translation of different sections of text in order. The computing device 601 may store the translation of the text in the memory. The restore and display module 690 may display the translation of the entire content of the file on a display or automatically send a notification to the user indicating that the translation of the content of the file has been completed. The notification may also indicate what sensitive information has been redacted or replaced with nonsensitive information and which translation engine(s) was used for translation.

The above-described modules may be executed in a client device such as the client 202 in FIGS. 5A and 5B. As mentioned above, the client 202 may use a resource access application 522 to communicate with the client interface service 514 as well as to present a user interface on the client 202 that a user 524 can operate to access the resource feed(s) 504 and/or the SaaS application(s) 508. As a result, the resource feed(s) 504 may allow the client 202 to use external translation engines to directly translate digital content on the client (202). In other words, the translation services may be embedded in the client (202) with a resource access application 522 thereof. The user interface on the client may always present a translation option for a selected portion of text. Alternatively, the client needs to launch a translation application before translation. For example, when the user 524 selects a local translation application, the resource access application 522 may cause the selected local application to launch on the client 202.

In some embodiments of the present disclosure, the client 202 may set mapping rules and determine which translation engine(s) to use for translation of digital content. Alternatively, the resource management service 502 or another device in the cloud computing environment 512 may set mapping rules and determine which translation engine(s) to use for translation. The mapping rules and the translation engine(s) may be then sent to the client 202. The client 202 may use the mapping rules to replace sensitive information in the content and may segment the information. The user interface on the client may allow the user to select (e.g., right-click, or highlight) the content and choose one or more translation engine from the presented options for translation. In this way, the cloud translation services are integrated into the client 202.

Figure 7:
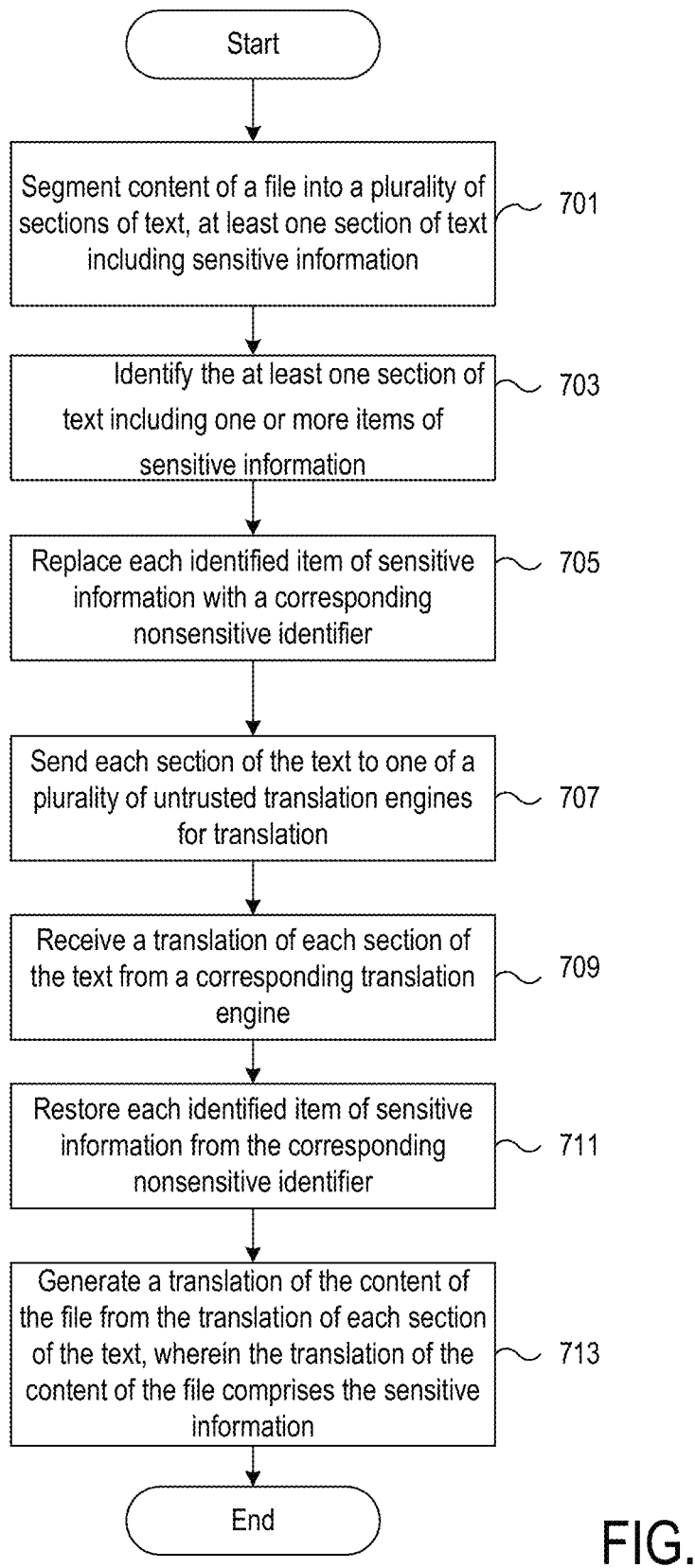
FIG. 7 depicts a flowchart showing an example method for translation of digital content in accordance with one or more illustrative aspects described herein.

FIG. 7 is a flowchart showing an example method for protecting content to be translated in accordance with one or more aspects of the present disclosure. The example method may be performed, for example, by the computing device described in connection with FIG. 6. The steps of the example method are described as being performed by particular computing devices or servers for the sake of simplicity, but the steps may be performed by any other apparatuses.

In step 701, a computing device may receive digital content (e.g., a file) and segment content of the file into a plurality of sections of text. At least one section of text may include sensitive information. The number of segmented sections may be determined based on the length of the file. Further, the computing device may have a set of policy files or otherwise be configured to segment the text. For example, the computing device may divide, based on the policy file, the text into a number of sections and each section is one or more paragraphs. The computing device may divide the text into a number of sections and individual sections include one or more sentences. Additionally or alternatively, the computing device may also receive the segmenting rules from the user by providing several options for selection. A user may also personalize the segmenting rules by selecting certain paragraphs or sentences in the text and labeling them as a section.

In step 703, the computing device may identify the at least one section of text including one or more items of sensitive information. In some examples, step 703 may be performed prior to step 701. The computing device may traverse the entire file and search for certain keywords or phrases based on a database storing potential sensitive information. A user may also determine and select the sensitive information from the text, and choose to either redact or replace, based on the mapping rules, the sensitive information. The details of identifying within the text sensitive information will be further described in connection with FIG. 8.

In step 705, the computing device may replace identified items of sensitive information with a corresponding nonsensitive identifier so as to prevent the release of the sensitive information during translation of the text. As discussed above, the computing device may have a database (e.g., a policy file) storing information that indicates the relationships between the sensitive information and the corresponding nonsensitive identifiers. In an example, the nonsensitive identifiers may be generated randomly. In another example, the nonsensitive identifiers may be determined based on a user's preferences.

In step 707, the computing device may send individual sections of text to one of a plurality of untrusted translation engines for translation. In some aspects of the present disclosure, a first section of text is sent to a first untrusted translation engine of the plurality of translation engines, and a second section of text is sent to a second untrusted translation engine of the plurality of translation engines so that no translation engine may have access to all the sections of text.

In some examples, the computing device may send sections of text to a different translation engine for translation. The user may also select which translation engine to use for translating certain sections of text based on the policy file. For example, if the user prefers Microsoft Translator, the user may send a request to the computing device and request certain sections be sent to Microsoft Translator for translation. If the section of text does not include any sensitive information (e.g., the section of text does not have any nonsensitive identifier), a random or previously used translation engine may be automatically selected by the computing device.

In step 709, the computing device may receive translations of sections of text from translation engines.

In step 711, the computing device may modify the nonsensitive identifiers by changing them back to the corresponding identified items of sensitive information. For example, the computing device may restore the sensitive information based on the policy files comprising the mapping rules. Therefore, the computing device may revert the nonsensitive identifiers back to the original sensitive information in the text (or a translated version thereof). The original sensitive information may be translated into another language separately by a trusted translator or by a trusted engine.

In step 713, the computing device may generate a translation of the digital content from the translation of sections of text. The translation of the digital content comprises items of sensitive information. Initially, the items of sensitive information may have not been translated. If the computing device or a user determines that one or more items of the sensitive information need to be translated, the sensitive information may be sent to a trusted engine or translator for translation. The computing device may restore the order of the section of text based on the original order of the sections of text, and generate a translation of the entire file by combining the individual sections of the translated content. The computing device may further display the translation of the file on a display and send a notification to the user. The notification may indicate that the translation has been completed, what sensitive information has been replaced or redacted during the translation process, and/or which translation engine(s) was used for translation, so that the user knows whether the digital content was securely translated.

Figure 8:
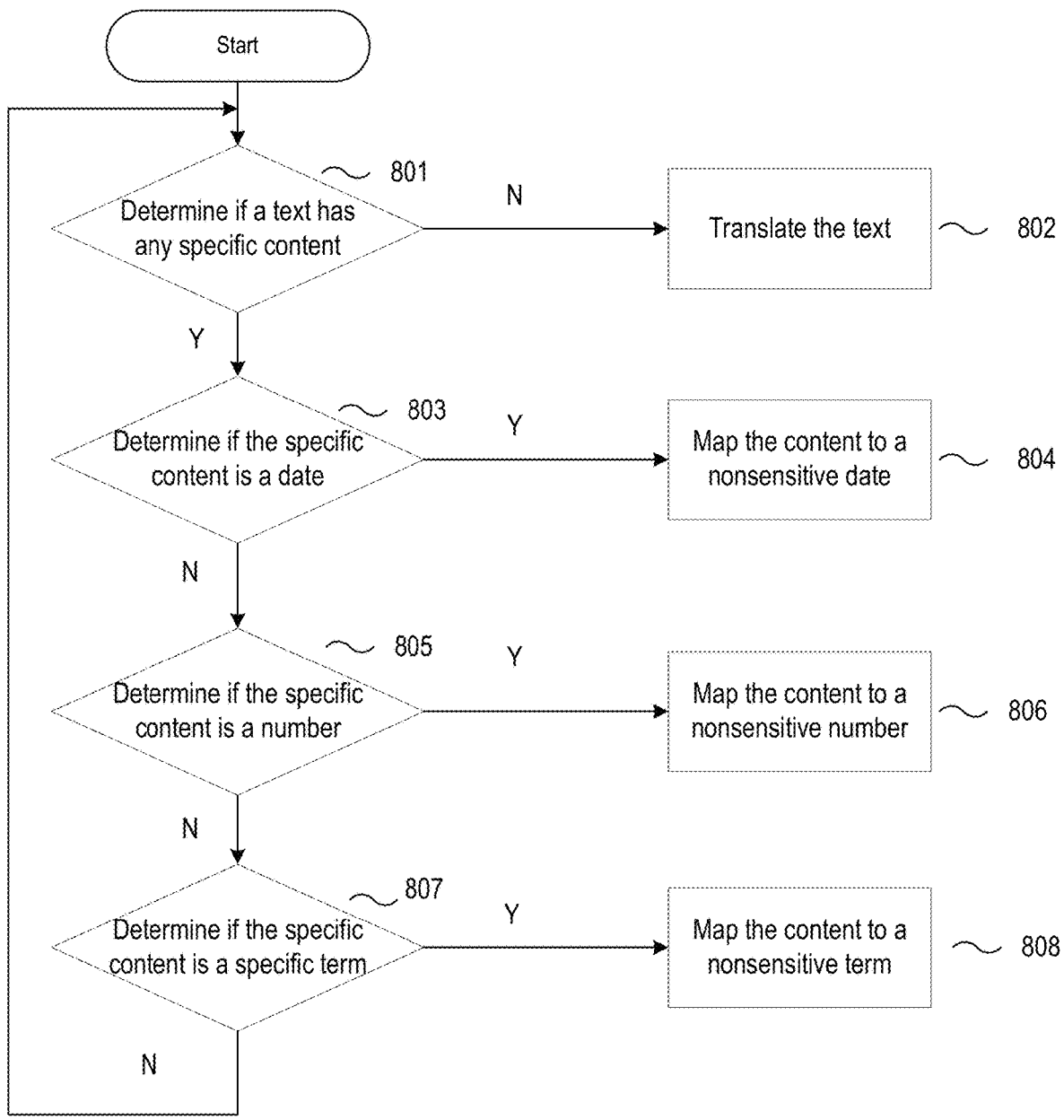
FIG. 8 depicts flowchart showing an example method for identifying and mapping information within the text of a file in accordance with one or more illustrative aspects described herein.

FIG. 8 is a flowchart showing an example method for identifying and mapping information within the text of a file in accordance with one or more aspects of the present disclosure. The example method may be performed, for example, by the computing device described in connection with FIG. 6. The steps of the example method are described as being performed by particular computing devices for the sake of simplicity, but the steps may be performed by any other computing device.

In step 801, the computing device may determine whether a text has any specific content (e.g., a string). In some examples, the content may correspond to the sensitive information stored in a database. The computing may query the database and retrieve one or more items of sensitive information as the specific content based on the user profile. In some other examples, the content may be previously input by a user. The content can be a word, a number, a price, or a phrase. The computing device may traverse the entire text to identify the string and determine the number of instances of the content. The location of the content in the text may also be determined. Specifically, the computing device may determine whether the content is in a specific paragraph of the text. As previously described, the computing device may automatically determine the number of the paragraphs and the sentences based on the detected punctuation marks and breaks. The computing device may also use a counter to count the number of paragraphs and the sentences in the text and determine the location of the content in a specific paragraph or sentence based on the counter.

If the computing device determines that the text does not have specific content (step 801: N), the method may proceed to step 802. In step 802, the computing device may send the text to a translation engine for translation. In some examples, the computing device may still segment the text into a plurality of sections and send sections to one of a plurality of translation engines for translation, even when no specific content is identified.

If the computing device determines that the text has at least one instance of specific content (step 801: Y), the method proceeds to step 803. In step 803, the computing device determines whether the content is a date. For example, regular expressions may be used to determine if the content is a date. A regular expression is a special text string for describing a search pattern and may be used by string searching techniques for "find" or "find and replace" operations on strings. If the content is determined to be a date (step 803: Y), the process may proceed to step 804. In step 804, the computing device may map the date to a nonsensitive date based on a rule (e.g., a predetermined rule). In some examples, the mapped nonsensitive date may be generated randomly. In some other examples, the user or the computer device may impose some restrictions on the generated date. For example, the generated nonsensitive date and the original date may be in the same year or century.

If the content is determined not to be a date (step 803: N), the process may proceed to step 805. In step 805, the computing device may determine if the content is a number. For example, each number may be encoded and denoted by a unique Unicode character. The content may be then identified to be a specific number based on the unique Unicode character. In addition, regular expressions may be used to determine if the content is a number. In some examples, the number may be a price. If the content is determined to be a number (step 805: Y), the method may proceed to step 806. In step 806, the computing device may map the string to a nonsensitive number based on a rule (e.g., a predetermined rule) as described above. In some examples, the mapped nonsensitive number may be generated randomly. In some other examples, the user or the computer device may impose some restrictions on the generated date. For example, the generated nonsensitive number may have the same digits as the original number.

If the content is determined not to be a number (step 805: N), the process may proceed to step 807. In step 807, the computing device may determine if the content is a specific term (e.g., a particular noun). For example, Java may be used to determine whether the content is a specific term. Specifically, the string equals( ) method compares two given strings based on the data/content of the string. If the contents of both the strings are the same, it returns true. If not all characters are matched, it returns false. The computing device may also query a database that includes a list of specific terms that need to be mapped and replaced for translation. If the content is determined to be a specific term (step 807: Y), the method may proceed to step 808. In step 808, the computing device may map the string to a nonsensitive term based on a predetermined rule. For example, "Citrix" may be mapped to "company1." In some examples, the mapped nonsensitive term may be generated randomly. In some other examples, the user or the computer device may impose some restrictions on the generated term. For example, the generated nonsensitive noun may reflect the generic meaning of the original sensitive term.

If the content is determined not to be a specific term (step 807: N), the process may proceed to step 801. In this case, the computing device may be configured to determine again whether the text has any specific content and the above-described process is repeated until the text contains no specific content. If the computing device determines that the text has no instances of specific content, the text may be segmented or sent to one or more translation engines for translation.

Some aspects the present disclosure also provide a method and an apparatus for preventing the release of sensitive information in sending and receiving a digital message (e.g., an email). Messages often contain sensitive information that is intended to be received only by the recipient. However, sometimes messages can be accidently delivered to an unintended recipient. In addition, the content of the message may be accidentally or intentionally seen by other people at work or at a public place. Therefore, there remains a need to minimize the risk of leaking sensitive information when sending and receiving a digital message.

Figure 9:
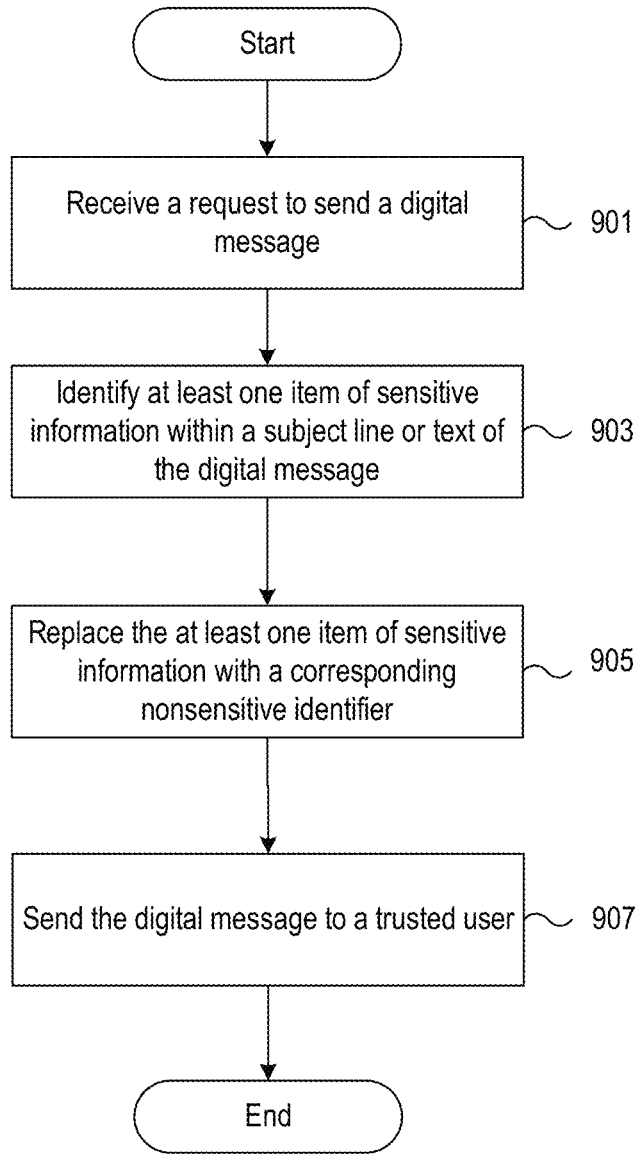
FIG. 9 depicts a flowchart showing an example method for securely sending a digital message in accordance with one or more illustrative aspects described herein.

FIG. 9 is a flowchart showing an example method for preventing the release of sensitive information when sending a digital message (e.g., an email, a text message, or an instant message). The example method may be performed, for example, by the computing device described in connection with FIG. 6. The steps of the example method are described as being performed by particular computing devices for the sake of simplicity, but the steps may be performed by any other computing device.

In step 901, a computing device (e.g., a cloud server, an email management server) may receive a request to send a digital message.

In step 903, the computing device may identify at least one item of sensitive information within a subject line or text of the message. Methods of identifying sensitive information may be used according to the description in connection with FIGS. 6-8.

In step 905, the computing device may replace the at least one item of sensitive information with a corresponding nonsensitive identifier. The nonsensitive identifiers may be emphasized (e.g., highlighted, underscored, or in a different color) in the message to indicate that they are not part of the original content. The mapping rules described above may be used to determine the corresponding nonsensitive identifier.

In step 907, the computing device may send the message to a trusted user. The message may not include sensitive information and may include nonsensitive identifiers instead. The message may reveal the sensitive information after the nonsensitive identifiers have been clicked on. For example, the recipient may click on the nonsensitive identifiers to obtain the sensitive information after the recipient's server confirms that the recipient is the intended recipient. In another example, the message may reveal the sensitive information when the user hovers the cursor over the nonsensitive identifiers on a display. When the cursor hovers over the nonsensitive identifiers, the shape of cursor may change from a regular shape to a special shape that indicates the sensitive information. Further, to ensure that the recipient or the viewer is a trusted user, before showing the sensitive information, the computing device may authenticate the identity of the viewer. For example, the computing device may require the viewer to enter login information before showing the sensitive information.

Additionally or alternatively, the computing device may send another digital message to the trusted user. The other message may include the mapping rules used for replacing the at least one item of sensitive information. Therefore, the recipient may refer to the mapping rules to restore the sensitive information in the previously received message.

Figure 10:
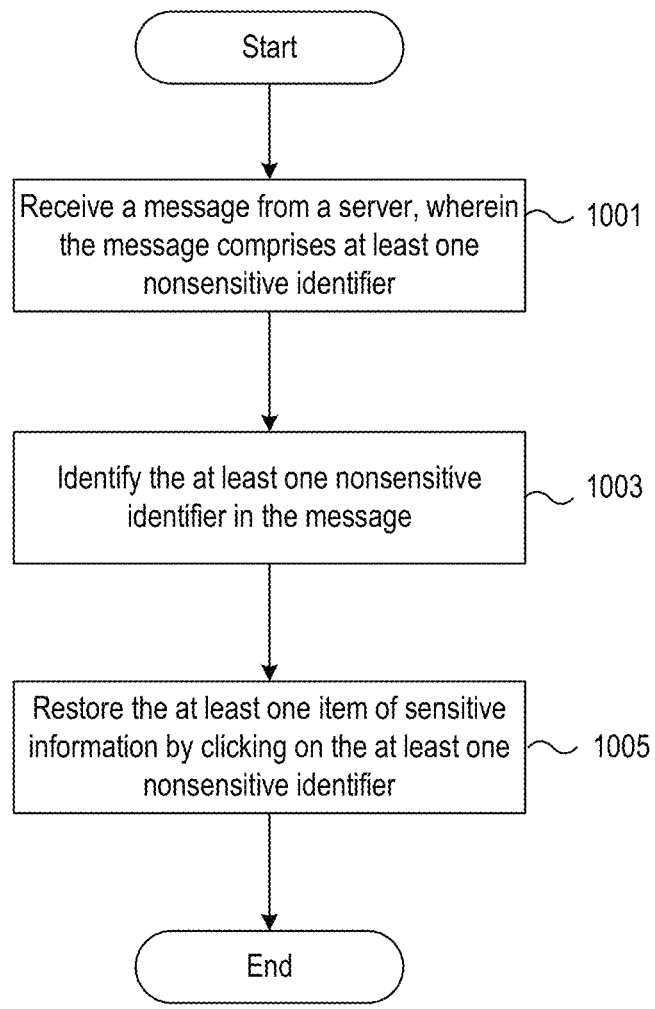
FIG. 10 depicts a flowchart showing an example method for receipt of digital content without being translated in accordance with one or more illustrative aspects described herein.

FIG. 10 is a flowchart showing an example method for preventing the release of sensitive information when receiving a digital message. The digital message may have not been translated into a different language. The example method may be performed, for example, by the computing device as described in connection with FIG. 6. The steps of the example method are described as being performed by particular computing devices for the sake of simplicity, but the steps may be performed by any other computing device.

In step 1001, a client device may receive or access a digital message from a computing device (e.g., server). The message may comprise at least one nonsensitive identifier.

In step 1003, the client device may identify the at least one nonsensitive identifier in the message. For example, the client device may receive a rule of identifying nonsensitive identifiers from the server and identify the at least one nonsensitive identifier in the message based on the received predetermined rule. The client device may also identify nonsensitive identifiers in the message based on previously identified nonsensitive identifiers.

In step 1005, the client device or the computing device may restore the at least one item of sensitive information based on an input on the at least one nonsensitive identifier. Specifically, receipt of an input on the at least one nonsensitive identifier may cause the client device or the computing device to replace the nonsensitive identifier with sensitive information. For example, after a user clicks on or hovers a cursor over the nonsensitive identifiers, the sensitive information may be displayed on a display of the client device. In some examples, before displaying the sensitive information on the display, the computing device or the client device may confirm and authenticate the identity of the user. For example, the user may be requested to provide the password of an account associated with the message.

In addition, a plugin may be developed and configured for implementation within an application that receives the message on the client device. The plugin may be configured to access the content of the application and extract the information of the user associated with the client device. Further, the plugin may be configured to authenticate the user based on the extracted information and request the user to provide information (e.g., account information) of the application. Once the user is authenticated, the plugin may send a message to the client device indicating that the sensitive information can be displayed on the display.

Additionally or alternatively, the client device may receive another message from the computing device. The other message may include the mapping rules used for replacing the at least one item of sensitive information. Therefore, the client device may use the mapping rules to restore the sensitive information in the previously received message.

Some aspects the present disclosure also provide a method and an apparatus for preventing release of sensitive information when sending a file to an external device. In an example, a computing device (e.g., the cloud management server 410) may store files that include sensitive information. The sensitive information may be leaked after the files are transferred to an external device. For example, employees may transfer those files to their personal devices (e.g., laptops) or personal emails from their company's server. It is possible that the sensitive information in the files may be released after being sent to any external device (e.g., an external server, a public cloud, or a local drive) that is located in an untrusted external network instead of a trusted internal network. Therefore, there remains a need to minimize the risk of leaking sensitive information from files on an external device. More specifically, there remains a need to prevent users from transferring sensitive information to an external device.

Figure 11:
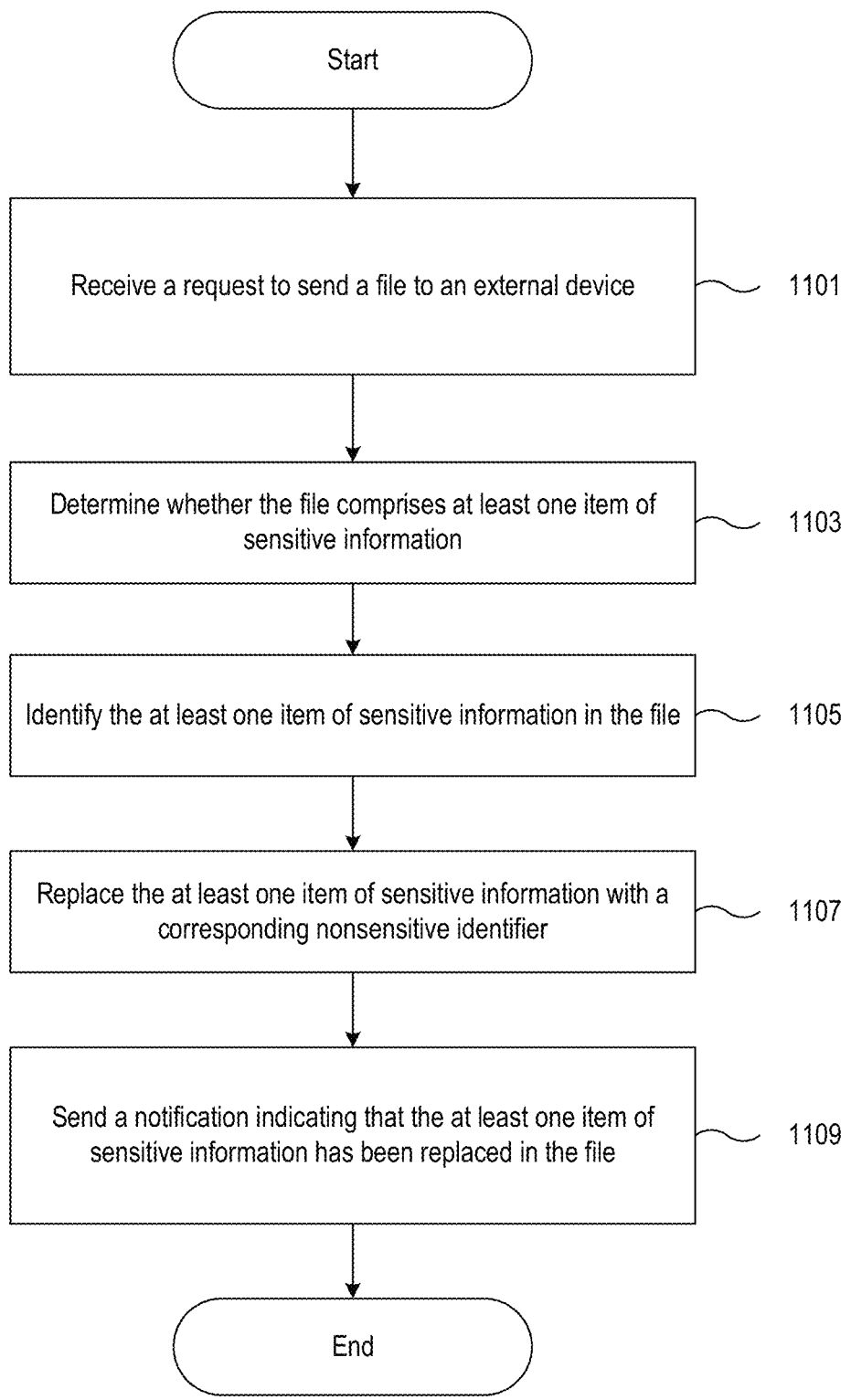
FIG. 11 depicts a flowchart showing an example method to prevent the release of information to an external device in accordance with one or more illustrative aspects described herein.

FIG. 11 is a flowchart showing an example method for preventing the release of sensitive information from files on an external device. The example method may be performed, for example, by the computing device described in connection with FIG. 6. The steps of the example method are described as being performed by particular computing devices for the sake of simplicity, but the steps may be performed by any other computing device.

In step 1101, a computing device (e.g., a server) may receive a request to send a file to an external device. For example, a user may try to copy a file to the user's personal cloud drive (e.g., Google Drive, Amazon Drive). The server may receive the request and may not instantly allow the transfer of the file to the external device. The server may be a proxy server that acts as a firewall between an internal network and an external network.

In step 1103, the server may determine if the file comprises at least one item of sensitive information. The server may traverse the content of the file to determine if the file contains certain keywords, phrases, or sentences. The traverse of the file to determine sensitive information has been described in connection with FIG. 8.

In step 1105, a server may identify the at least one item of sensitive information in the file. For example, the server may identify that "Citrix" is sensitive information in the file and determine that the sensitive information should not be moved to an external device from the server. The identification of sensitive information has been described in connection with FIGS. 6 and 7.

In step 1107, the server may replace the at least one item of sensitive information with a corresponding nonsensitive identifier. The server may first create a copy of the file to be sent to the external device and replace the at least one item of sensitive information with a corresponding nonsensitive identifier in the copy of the file. Therefore, the server may not need to modify the original file. The copy of file may be then sent to the external device. Alternatively, the server may replace the at least one item of sensitive information in the original file if the server determines that the server does not need to keep the file. The server may use the mapping rules described above for replacing the at least one item of sensitive information.

In step 1109, the server may send a notification indicating that the at least one item of sensitive information has been replaced in the file. The notification may be sent to the user requesting the transfer of the file or directly to the external device. In addition, the server may include a database that indicates which file(s) has been moved to an external device or has been modified. The database may be constantly updated by the server.

The following paragraphs (M1) through (M8) describe examples of methods that may be implemented in accordance with the present disclosure.

(M1) A method comprising: segmenting, by a computing device, content of a file into a plurality of sections of text, at least one section of text including an item of sensitive content and items of nonsensitive content; replacing, by the computing device, the item of sensitive content with replacement content, wherein the replacement content enables translation of the at least one section of text without use of the sensitive content; sending, by the computing device, the plurality of sections of text to remote computing devices for translation, the at least one section of text being sent to a remote computing device different than remote computing devices for translation of other sections of text; modifying, by the computing device, the translation of the at least one section of text received from the remote computing device to include the item of sensitive content instead of the replacement content, so that the at least one section of text includes the item of sensitive content in untranslated form and the items of nonsensitive content in translated form; and generating, by the computing device, a translation of the content of the file based on translations of the plurality of sections of text received from the remote computing devices, so as to prevent the release of the item of sensitive content during translation of the file.

(M2) A method may be performed as described in paragraph (M1) wherein the replacing further comprises replacing the item of sensitive content with the replacement content based on a policy file stored in a memory coupled to the computing device, and the policy file comprises information that indicates a relationship between the item of sensitive content and the replacement content.

(M3) A method may be performed as described in paragraph (M2) further comprising: receiving an indication of selecting the policy file from a plurality of policy files, wherein a first one of the plurality of policy files indicates replacing the item of sensitive content with first replacement content and a second one of the plurality of policy files indicates replacing the item of sensitive content with second replacement content.

(M4) A method may be performed as described in any of paragraphs (M1) through (M3) wherein the item of sensitive content comprises a date, a number, a price, or a name of a company.

(M5) A method may be performed as described in any of paragraphs (M1) through (M4) further comprising: identifying, by the computing device, the at least one section of text including an item of sensitive content.

(M6) A method may be performed as described in any of paragraphs (M1) through (M5) further comprising: selecting the remote computing device based on a policy file stored in a memory coupled to the computing device, wherein the policy file indicates whether the selected remote computing device is trusted by the computing device, and the replacing is performed only when the selected remote computing device is not trusted by the computing device.

(M7) A method may be performed as described in any of paragraphs (M1) through (M6) wherein the segmenting further comprises segmenting the content of the file into the plurality of sections of text based on a length of the content.

(M8) A method may be performed as described in any of paragraphs (M1) through (M7) further comprising: receiving, by the computing device, a translation of each section of text from the remoting computing devices.

The following paragraphs (A1) through (A6) describe examples of apparatuses that may be implemented in accordance with the present disclosure.

(A1) An apparatus comprising: one or more processors; and memory storing instructions that, when executed by the one or more processors, cause the apparatus to: segment content of a file into a plurality of sections of text, at least one section of text including an item of sensitive content and items of nonsensitive content; replace the item of sensitive content with replacement content, wherein the replacement content enables translation of the at least one section of text without use of the sensitive content; send the plurality of sections of text to remote computing devices for translation, the at least one section of text being sent to a remote computing device different than another remote computing device for translation of another section of text; modify the translation of the at least one section of text received from the remote computing device to include the item of sensitive content instead of the replacement content, so that the at least one section of text includes the item of sensitive content in untranslated form and the items of nonsensitive content in translated form; and generate a translation of the content of the file based on translations of the plurality of sections of text received from the remote computing devices, so as to prevent the release of the item of sensitive content during translation of the file.

(A2) An apparatus may be implemented as described in paragraph (A1) wherein the instructions, when executed by the one or more processors, further cause the apparatus to: replace the item of sensitive content with the replacement content based on a policy file stored in the memory, wherein the policy file comprises information that indicates a relationship between the item of sensitive content and the replacement content.

(A3) An apparatus may be implemented as described in paragraph (A2) wherein the instructions, when executed by the one or more processors, further cause the apparatus to: receive an indication of selecting the policy file from a plurality of policy files, wherein a first one of the plurality of policy files indicates replacing the item of sensitive content with first replacement content and a second one of the plurality of policy files indicates replacing the item of sensitive content with second replacement content.

(A4) An apparatus may be implemented as described in any of paragraphs (A1) through (A3) wherein the item of sensitive content comprises a date, a number, a price, or a name of a company.

(A5) An apparatus may be implemented as described in any of paragraphs (A1) through (A4) wherein the instructions, when executed by the one or more processors, further cause the apparatus to: select the remote computing device based on a policy file stored in the memory, wherein the policy file indicates whether the selected remote computing device is trusted by the computing device, and replace the item of sensitive content with the replacement content only when the selected remote computing device is not trusted by the computing device.

(A6) An apparatus may be implemented as described in any of paragraphs (A1) through (A5) wherein the instructions, when executed by the one or more processors, further cause the apparatus to: segment the content of the file into the plurality of sections of text based on a length of the content.

The following paragraphs (CRM1) through (CRM6) describe examples of computer-readable media that may be implemented in accordance with the present disclosure.

(CRM1) A non-transitory computer-readable medium storing instructions that, when executed, cause: segmenting content of a file into a plurality of sections of text, at least one section of text including an item of sensitive content and items of nonsensitive content; replacing the item of sensitive content with replacement content, wherein the replacement content enables translation of the at least one section of text without use of the sensitive content; sending the plurality of sections of text to remote computing devices for translation, the at least one section of text being sent to a remote computing device different than another remote computing device for translation of another section of text; modifying the translation of the at least one section of text received from the remote computing device to include the item of sensitive content instead of the replacement content, so that the at least one section of text includes the item of sensitive content in untranslated form and the items of nonsensitive content in translated form; and generating a translation of the content of the file based on translations of the plurality of sections of text received from the remote computing devices, so as to prevent the release of the item of sensitive content during translation of the file.

(CRM2) A non-transitory computer-readable medium may be implemented as described in paragraph (CRM1) wherein the instructions, when executed, further cause: replacing the item of sensitive content with the replacement content based on a policy file stored in a memory, wherein the policy file comprises information that indicates a relationship between the item of sensitive content and the replacement content.

(CRM3) A non-transitory computer-readable medium may be implemented as described in paragraph (CRM2) wherein the instructions, when executed, further cause: receiving an indication of selecting the policy file from a plurality of policy files, wherein a first one of the plurality of policy files indicates replacing the item of sensitive content with first replacement content and a second one of the plurality of policy files indicates replacing the item of sensitive content with second replacement content.

(CRM4) A non-transitory computer-readable medium may be implemented as described in any of paragraphs (CRM1) through (CRM3) wherein the item of sensitive content comprises a date, a number, a price, or a name of a company.

(CRM5) A non-transitory computer-readable medium may be implemented as described in any of paragraphs (CRM1) through (CRM4) wherein the instructions, when executed, further cause: receiving a translation of each section of text from the remoting computing devices.

(CRM6) A non-transitory computer-readable medium may be implemented as described in any of paragraphs (CRM1) through (CRM5) wherein the instructions, when executed, further cause: selecting the remote computing device based on a policy file stored in a memory, wherein the policy file indicates whether the selected remote computing device is trusted by the computing device, and the replacing is performed only when the selected remote computing device is not trusted by the computing device.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method comprising:
   segmenting, by a computing device, content of a file into a plurality of sections of text, at least one section of text of the plurality of sections of text including an item of sensitive content and items of nonsensitive content, wherein the segmentation of the content of the file is based on at least one of a first threshold number for a total number of identified sensitive items in the file, or a second threshold number for the identified sensitive items in each of the plurality of sections of text, determined based on a level of secrecy;
   replacing, by the computing device, the item of sensitive content with replacement content, so that the at least one section includes the item with replacement content and the items of nonsensitive content, wherein the replacement content enables translation of the at least one section of text without use of the sensitive content;
   sending, by the computing device, the plurality of sections of text to a plurality of remote computing devices for translation, wherein the at least one section of text having the item with the replacement content and the items of nonsensitive content is sent to a remote computing device for translation of the at least one section of text, and another section of text being sent to another remote computing device for translation of the another section of text, and wherein the remote computing device is different than the another remote computing device;
   modifying, by the computing device, the translation of the at least one section of text received from the remote computing device to include the item of sensitive content instead of the replacement content, so that the at least one section of text includes the item of sensitive content in untranslated form and the items of nonsensitive content in translated form; and
   generating, by combining translations of the plurality of sections of text received from the remote computing devices in an order, by the computing device, a translation of the content of the file, so as to prevent the release of the item of sensitive content during translation of the file.

2. The method of claim 1, wherein
   the replacing further comprises replacing the item of sensitive content with the replacement content based on a policy file stored in a memory coupled to the computing device, and
   the policy file comprises information that indicates a relationship between the item of sensitive content and the replacement content.

3. The method of claim 2, further comprising:
   receiving an indication of selecting the policy file from a plurality of policy files, wherein a first one of the plurality of policy files indicates replacing the item of sensitive content with first replacement content and a second one of the plurality of policy files indicates replacing the item of sensitive content with second replacement content.

4. The method of claim 1, wherein the item of sensitive content comprises a date, a number, a price, or a name of a company.

5. The method of claim 1, further comprising identifying, by the computing device, the at least one section of text including an item of sensitive content.

6. The method of claim 1, further comprising:
   selecting the remote computing device based on a policy file stored in a memory coupled to the computing device, wherein
   the policy file indicates whether the selected remote computing device is trusted by the computing device, and
   the replacing is performed only when the selected remote computing device is not trusted by the computing device.

7. The method of claim 1, wherein the segmenting further comprises segmenting the content of the file into the plurality of sections of text based on a length of the content.

8. The method of claim 1, wherein the order of combining the translations of the plurality of sections of text received from the remote computing devices is based on an original order of the sections of text in the file.

9. An apparatus comprising:
one or more processors; and
memory storing instructions that, when executed by the one or more processors, cause the apparatus to:
  segment content of a file into a plurality of sections of text, at least one section of text of the plurality of sections of text including an item of sensitive content and items of nonsensitive content, wherein the segmentation of the content of the file is based on at least one of a first threshold number for a total number of identified sensitive items in the file, or a second threshold number for the identified sensitive items in each of the plurality of sections of text, determined based on a level of secrecy;
  replace the item of sensitive content with replacement content, so that the at least one section includes the item with replacement content and the items of nonsensitive content, wherein the replacement content enables translation of the at least one section of text without use of the sensitive content;
  send the plurality of sections of text to a plurality of remote computing devices for translation, wherein the at least one section of text having the item with the replacement content and the items of nonsensitive content is sent to a remote computing device for translation of the at least one section of text, and another section of text being sent to another remote computing device for translation of the another section of text, and wherein the remote computing device is different than the another remote computing device;
  modify the translation of the at least one section of text received from the remote computing device to include the item of sensitive content instead of the replacement content, so that the at least one section of text includes the item of sensitive content in untranslated form and the items of nonsensitive content in translated form; and
  generate, by combining translations of the plurality of sections of text received from the remote computing devices in an order, a translation of the content of the file, so as to prevent the release of the item of sensitive content during translation of the file.

10. The apparatus of claim 9, wherein the instructions, when executed by the one or more processors, further cause the apparatus to:
  replace the item of sensitive content with the replacement content based on a policy file stored in the memory, wherein the policy file comprises information that indicates a relationship between the item of sensitive content and the replacement content.

11. The apparatus of claim 10, wherein the instructions, when executed by the one or more processors, further cause the apparatus to:
  receive an indication of selecting the policy file from a plurality of policy files, wherein a first one of the plurality of policy files indicates replacing the item of sensitive content with first replacement content and a second one of the plurality of policy files indicates replacing the item of sensitive content with second replacement content.

12. The apparatus of claim 9, wherein the item of sensitive content comprises a date, a number, a price, or a name of a company.

13. The apparatus of claim 9, wherein the instructions, when executed by the one or more processors, further cause the apparatus to:
  select the remote computing device based on a policy file stored in the memory, wherein
  the policy file indicates whether the selected remote computing device is trusted by the computing device, and
  replace the item of sensitive content with the replacement content only when the selected remote computing device is not trusted by the computing device.

14. The apparatus of claim 9, wherein the instructions, when executed by the one or more processors, further cause the apparatus to:
  segment the content of the file into the plurality of sections of text based on a length of the content.

15. One or more non-transitory computer readable media storing computer readable instructions that, when executed, cause:
  segmenting content of a file into a plurality of sections of text, at least one section of text of the plurality of sections of text including an item of sensitive content and items of nonsensitive content, wherein the segmentation of the content of the file is based on at least one of a first threshold number for a total number of identified sensitive items in the file, or a second threshold number for the identified sensitive items in each of the plurality of sections of text, determined based on a level of secrecy;
  replacing the item of sensitive content with replacement content, so that the at least one section includes the item with replacement content and the items of nonsensitive content, wherein the replacement content enables translation of the at least one section of text without use of the sensitive content;
  sending the plurality of sections of text to a plurality of remote computing devices for translation, wherein the at least one section of text having the item with the replacement content and the items of nonsensitive content is sent to a remote computing device for translation of the at least one section of text, and another section of text being sent to another remote computing device for translation of the another section of text, and wherein the remote computing device is different than the another remote computing device;
  modifying the translation of the at least one section of text received from the remote computing device to include the item of sensitive content instead of the replacement content, so that the at least one section of text includes the item of sensitive content in untranslated form and the items of nonsensitive content in translated form; and
  generating, by combining translations of the plurality of sections of text received from the remote computing devices in an order, a translation of the content of the file, so as to prevent the release of the item of sensitive content during translation of the file.

16. The one or more non-transitory computer readable media of claim 15, wherein the instructions, when executed, further cause:
  replacing the item of sensitive content with the replacement content based on a policy file stored in a memory, wherein the policy file comprises information that indicates a relationship between the item of sensitive content and the replacement content.

17. The one or more non-transitory computer readable media of claim 16, wherein the instructions, when executed, further cause:
  receiving an indication of selecting the policy file from a plurality of policy files, wherein a first one of the plurality of policy files indicates replacing the item of sensitive content with first replacement content and a second one of the plurality of policy files indicates replacing the item of sensitive content with second replacement content.

18. The one or more non-transitory computer readable media of claim 15, wherein the item of sensitive content comprises a date, a number, a price, or a name of a company.

19. The one or more non-transitory computer readable media of claim 15, wherein the instructions, when executed, further cause:
- selecting the remote computing device based on a policy file stored in a memory, wherein
- the policy file indicates whether the selected remote computing device is trusted by the computing device, and
- the replacing is performed only when the selected remote computing device is not trusted by the computing device.

20. The one or more non-transitory computer readable media of claim 15, wherein the order of combining the translations of the plurality of sections of text received from the remote computing devices is based on an original order of the sections of text in the file.

* * * * *